US011133835B2

(12) United States Patent
Muralidhar

(10) Patent No.: US 11,133,835 B2
(45) Date of Patent: Sep. 28, 2021

(54) METHOD FOR IMPROVING SIGNAL TO NOISE RATIO IN AN UPLINK TRANSMISSION

(71) Applicant: Karthik Muralidhar, Bangalore (IN)

(72) Inventor: Karthik Muralidhar, Bangalore (IN)

( * ) Notice: Subject to any disclaimer, the term of this patent is extended or adjusted under 35 U.S.C. 154(b) by 0 days.

(21) Appl. No.: 16/752,707

(22) Filed: Jan. 27, 2020

(65) Prior Publication Data

US 2020/0162116 A1     May 21, 2020

Related U.S. Application Data

(63) Continuation of application No. 15/767,356, filed on Apr. 11, 2018, now Pat. No. 10,587,293.

(30) Foreign Application Priority Data

Jul. 26, 2016    (IN) .............................. 201641025446

(51) Int. Cl.
| | | |
|---|---|---|
| *H04B 1/04* | (2006.01) |
| *H04B 1/10* | (2006.01) |
| *H04B 1/62* | (2006.01) |
| *H04J 11/00* | (2006.01) |
| *H04B 17/336* | (2015.01) |
| *H04B 1/7107* | (2011.01) |
| *H04B 7/0456* | (2017.01) |
| *H04W 72/12* | (2009.01) |

(52) U.S. Cl.
CPC ............ *H04B 1/0475* (2013.01); *H04B 1/10* (2013.01); *H04B 1/62* (2013.01); *H04B 1/71075* (2013.01); *H04B 7/0456* (2013.01); *H04B 17/336* (2015.01); *H04J 11/003* (2013.01); *H04W 72/121* (2013.01)

(58) Field of Classification Search
CPC .... H04W 72/121; H04W 4/08; H04B 7/0456; H04B 7/0639; H04B 7/0452; H04B 1/0475; H04B 17/336; H04B 1/10; H04B 1/62; H04B 1/71075; H04J 11/003
See application file for complete search history.

(56) References Cited

U.S. PATENT DOCUMENTS

| 8,730,788 | B2 * | 5/2014 | Dao ..................... H04B 7/0854 370/203 |
| 2009/0252091 | A1 * | 10/2009 | Tang ..................... H04W 16/28 370/328 |

(Continued)

FOREIGN PATENT DOCUMENTS

WO    WO-2016155758 A1 * 10/2016 ........... H04L 5/0035

*Primary Examiner* — Sophia Vlahos

(57) ABSTRACT

A method for improving signal to noise ratio in an uplink transmission. The method includes determining a plurality of combinations of "N" possible users to be selected among "X" users that are transmitting signals to a base station comprising "n" number of antennas, where n>=N, wherein selected "N" users transmit on a same sub-carrier; computing signal to noise ratio (SNR) of the signals received from each of the users among the determined combination of "N" possible users; and selecting at least one combination among the plurality of combinations of "N" possible users, such that, a combined signal to noise ratio of the selected combination is maximum among all combinations.

20 Claims, 19 Drawing Sheets

(56) References Cited

U.S. PATENT DOCUMENTS

2013/0287132 A1* 10/2013 Taoka ............... H04L 25/03949
375/267
2015/0131753 A1* 5/2015 Maruta ............. H04L 25/03968
375/267

* cited by examiner

| Base station 110 | Processor 102 | IRC unit 108 |
|---|---|---|
| X users are associated with a plurality of base stations. 302 | Determine a plurality of combinations of N possible users to be selected among the X users, such that each of the N users transmits to at all the base stations wherein each base station comprising n number of antennas 304 | Represent the input data signal transmitted by user as product of a Hermitian matrix and a received signal Y across n*N antennas of all the base stations using a Hermitian function. 306 |
|  |  | Determine n*Nx1 Hermitian matrix for each user representing n*N channels of each user to all the base station and a covariance matrix. 308 |
|  | Select at least one combination of N users among the plurality of combinations of N possible users, such that, the $N^{th}$ root of the product of the signal to noise ratios (SNR) of the selected N users is maximum among all combinations 314 | Calculate signal to noise ratio using the IRC function on the received signal across all the n*N antennas of all the base stations. 310 |
|  |  | Calculate the SNR for the determined combination of N possible users using the IRC function on the received signal from each of the users. 312 |

14 - SVD - based MIMO receiver per BS, No interfrence from other BS
16 - SVD - based MIMO receiver per BS, interfrence from other BS
18 - Proposed method 20 - First SINR of existing user
22 - First SINR of existing user after addition of new user
24 - Second SINR of existing user
26 - Second SINR of existing User after addition of new user
28 - SINR of New user

METHOD FOR IMPROVING SIGNAL TO NOISE RATIO IN AN UPLINK TRANSMISSION

BACKGROUND

Unless otherwise indicated herein, the materials described in this section are not prior art to the claims in this application and are not admitted to being prior art by inclusion in this section.

FIELD

The subject matter in general relates to LTE network systems. More particularly, but not exclusively, the subject matter is directed to reduction of interference and improvement of signal strength in an LTE system.

DISCUSSION OF RELATED ART

Long-Term Evolution (LTE) is standard for high-speed wireless communication for mobile phones. It increases the capacity and speed using different radio interface together with core network improvements. In LTE, new technologies have recently been adapted where there is co-operation between base station and the user signals received by these base stations are processed by a Central Processing Unit (CPU). Pertaining to cellular networks, the radio uplink is the transmission path from the mobile station (cell phone) to a base station (cell site). Physical uplink shared channel is used to carry the uplink user's information data.

Signal to Noise Ratio (SNR) is one of the most important indicators to represent signal strength in LTE systems. As SNR decreases, the quality of the signal gets poorer which means higher interference or noise level in any network systems. As SNR goes lower, the probability of error goes higher leading to poor network throughput.

Traditionally, signals from one user in one subcarrier face interference from the signals from the other users in the same subcarrier which decreases the network throughput of the wireless network systems.

Further, MIMO (Multiple Input Multiple Output) is another of the LTE major technology innovations used to improve the performance of the system. MIMO systems use more than one transmit antenna to send a signal on the same frequency to more than one receiving antenna. This technology provides LTE with the ability to further improve its data throughput. Although, it enables far high data rates to be achieved but ends up adding complexity to the system in terms of processing and the number of antennas required.

When multiple users access the LTE base station simultaneously, then the available data throughput is shared among them. Different users will typically place different throughput demands on a LTE base station at a given time, but at times when the aggregate throughput demands exceed the available throughput from the LTE base station to the users, then some or all users will receive less data throughput than they are seeking.

In light of the above drawbacks, a system and method for reducing interference and improving signal strength in an LTE system is required.

SUMMARY

In an aspect, a method is provided for improving signal to noise ratio in an uplink transmission. The method includes determining a plurality of combinations of "N" possible users to be selected among "X" users that are transmitting signals to a base station comprising "n" number of antennas, where n>=N, wherein selected "N" users transmit on a same sub-carrier; computing signal to noise ratio (SNR) of the signals received from each of the users among the determined combination of "N" possible users; and selecting at least one combination among the plurality of combinations of "N" possible users, such that, a combined signal to noise ratio of the selected combination is maximum among all combinations.

In another aspect, a method is provided for improving signal to noise ratio in an uplink transmission. The method includes receiving signals from "X" users at a plurality of antennas present in a plurality of base stations; determining a plurality of combinations of "N" possible users to be selected among the "X" users, wherein each of the "N" users is associated with one base station, such that each of the "N" users transmit to all the base stations, each comprising at least "n" number of antennas, where n>=N, wherein each of the "N" users transmit on a same sub-carrier; computing signal to noise ratio for each of the users among the determined combinations of "N" possible users by using signals received by all the antennas of all the base stations; and selecting at least one combination among the plurality of combinations of "N" possible users, such that, a combined signal to noise ratio of the selected combination is maximum among all combinations.

In yet another aspect, a method is provided for improving signal to noise ratio in an uplink transmission. The method includes receiving signals from "X" users, each of the "X" users comprising two antennas, at a plurality of antennas present in a plurality of base stations; determining a plurality of combinations of "N" possible users to be selected among the "X" users, wherein each of the "N" users is associated with one base station, such that each of the "N" users transmit to all the base stations, each comprising at least "n" number of antennas, where n>=N, wherein each of the "N" users transmit on a same sub-carrier; computing signal to noise ratio for each of the users among the determined combinations of "N" possible users; and selecting at least one combination among the plurality of combinations of "N" possible users, such that, a combined signal to noise ratio of the selected combination is maximum among all combinations.

In still another aspect, a method is provided for accommodating multiple users transmitting on a same sub-carrier to a base station comprising n antennas. The method includes enabling a first user to transmit two bits through two antennas of a user equipment of the first user; decomposing a (n×2) channel matrix of the first user using Singular Value Decomposition (SVD), into three matrices, wherein the matrices are a (n×n) unitary matrix which is denoted by "U", a (n×2) partial diagonal matrix which is denoted by "S" and a precoder (2×2) unitary matrix which is denoted by "$V^H$"; enabling other (n−2) users in the base station to transmit one data bit each through two antennas to the base station on same sub-carrier as the first user; computing effective channel matrix of the first user; computing effective channel vectors of the (n−2) users using "U"; computing transmit precoders of the (n−2) users using "U"; and computing signal to noise ratio and decoding the input bits of the users by applying Interference Rejection Combining (IRC) function using the signals received by the n antennas of the base station and effective channel vectors of the first user and the (n−2) users.

In still another aspect, a method is provided for accommodating multiple users transmitting on a same sub-carrier to a base station comprising n antennas. The method includes computing precoder determination algorithm (PDA) values corresponding to "X" users, wherein for each of the "X" users "n" such PDA values are computed, wherein the PDA values [V, Θ]=ψ[U, h, k] where "V" is a precoder matrix used for transmitting bits, "Θ" is a scalar value, "U" is a unitary matrix, "h" is a channel matrix of that user and "k" is a value from 1 to "n", thereby resulting in X*n PDA values; identifying a maximum value of "Θ" for each value of "k", thereby resulting in "n" maximum values of "Θ" from the X*n PDA values; and selecting the users to which the "n" maximum values of "Θ" correspond, to transmit to a base station through two antennas in a same sub-carrier, wherein each of the selected users is allowed to transmit "m" number of bits to the base station, where "m" is the number of maximum values of "Θ" out of "n" maximum values of "Θ", corresponding to respective selected user.

BRIEF DESCRIPTION OF THE DRAWINGS

Embodiments are illustrated by way of example and not limitation in the Figures of the accompanying drawings, in which like references indicate similar elements and in which:

FIG. 3A is a flowchart 320 which illustrates a second exemplary method for improving the SNR of signals in an uplink transmission;

DETAILED DESCRIPTION

Figure 1:
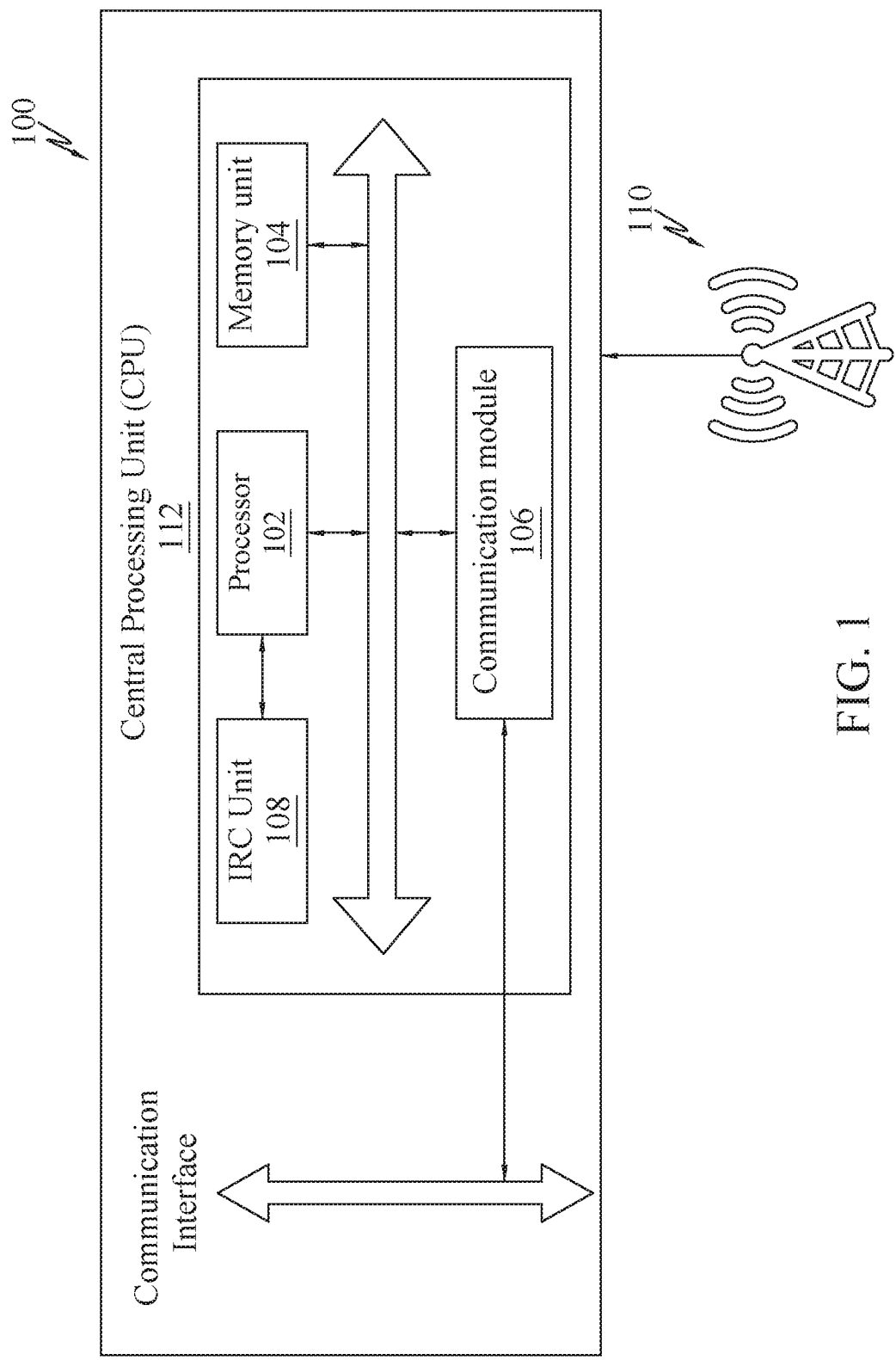
FIG. 1 is a block diagram of a system 100 for improving signal to noise ratio in an uplink transmission.

I. OVERVIEW
II. EXEMPLARY SYSTEM
III. FIRST EXEMPLARY METHOD FOR IMPROVING SNR-1 CELL, 1 BS, MANY USERS ON SAME SUB-CARRIER, 1 ANTENNA/USER
IV. SECOND EXEMPLARY METHOD FOR IMPROVING SNR-N CELL, N BS, 1 USER/BS ON A GIVEN SUB-CARRIER, 1 ANTENNA/USER
V. THIRD EXEMPLARY METHOD FOR IMPROVING SNR-N CELL, N BS, 1 USER/BS ON A GIVEN SUB-CARRIER, 2 ANTENNA/USER
VI. ACCOMMODATING MORE USERS IN A CELL ON THE SAME SUB-CARRIER
VII. SELECTING BEST USERS FOR ACCOMMODATING IN A CELL ON THE SAME SUB-CARRIER
VIII. COMPUTING SIGNAL TO NOISE RATIOS
IX. ANTENNA SELECTION FOR IMPROVING SNR
X. CHANNEL ESTIMATION
XI. CONCLUSION

The following detailed description includes references to the accompanying drawings, which form part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Throughout the document, the word "bits" may mean symbols as in constellation mapping in digital communications.

I. Overview

Embodiments provide a system and method for improving strength of signals in uplink transmission. Embodiments, further, provide methods for increasing the overall spectral efficiency in an uplink transmission. The system includes a processor which communicates with the base stations. The processor is configured to process the received signals in order to improve the SNR of the signals. The system includes a memory unit, communication module, and an IRC unit. The IRC unit is responsible for computing the signal to noise ratio of the uplink signals received at one or more antennas of one or more base station in the system. Methods are provided for determining a plurality of combinations of N possible users (users may refer to user equipments) to be selected among X users that are transmitting signals to one or more base stations each comprising "n" number of antennas, where generally, though not necessarily, n>=N. The IRC unit is configured to compute signal to noise ratio (SNR) of the signals received from each of the users among the determined combinations of N possible users and selecting at least one combination among the plurality of combinations of N possible users. The combination is selected, such that, a consolidated signal to noise ratio of the selected combination is maximum among all combinations. Methods are provided for efficiently computing the SNR of the signals received at the antennas of the base station. The IRC unit is configured to compute signal to noise ratio for at least a predetermined number of users in one or more of the combination of N possible users. The calculated signal to noise ratio for the predetermined number of users are recorded in the memory unit of the system. Further, signal to noise ratios, which are calculated previously, are used in the calculation of SNRs of the subsequent combinations of N possible users. Methods are provided for increasing the performance of the user equipment's communicating to the base stations. Furthermore, to elevate the network capacity i.e. the number of users for the network is equally taken into consideration. In an uplink transmission, the uplink shared channel is used to carry the uplink's information data over a subcarrier. The scenario wherein there is a communication between the user equipment's and the respective base station at the same time, there is a huge possibility of the interference among the user equipment's communicating simultaneously. The processor determines the best user to be selected among all the user communicating to the base station at the same time which can be allowed for the transmission without interfering with the communication of the other users. The system makes use of simplified algorithms which increases the processing and elevates overall throughput of the network mitigating the loss which can be caused by the interference when the user equipment's are communicating to the base station at the same time. Embodiments provide methods for selecting the best possible antennas of the base stations. Embodiments further provide methods for estimating the channel values of the user equipment's if they occur to carry out the uplink transmission over "N" number of subcarriers. While considering the transmission across the set of subcarriers, the reception of the data at each subcarrier will be the summation of the transmission by the all user equipment's. The processor estimates the channel values of each user equipment's for the given output signal received at base station where channel values vary when transmitted over "N" number of subcarriers.

II. Exemplary System

Referring to the figures, more particularly to FIG. 1, an exemplary architecture of an exemplary system 100 for improving signal to noise ratio in an uplink transmission. In this section, the system components/modules are discussed.

The system 100 includes, but not limited to, a processor 102, a memory unit 104 and a network communication module 106. System 100 may further include an interference rejection combining unit 108 or an IRC unit 108. System 100 may include provisions for receiving signals from a plurality of base stations 110 of cellular networks, wherein base stations 110 may belong to one or more small cells. Base stations 110 may be included as part of the system 100. The system 100 may further include a memory unit 104, wherein the memory unit 104 is configured to store or keep records of the computations which aids in further computations and making the processing much faster. A communication interface may be present which helps to communicate with the plurality of the base stations. A Central Processing Unit (CPU) 112 includes, but not limited to, the processor 102, the memory unit 104, the communication module 106, the IRC unit 108. The communication module(s) 106 may interact with base stations 110 and all the base stations may be connected to the Central Processing Unit where the received signals are processed. There may be multiple communication modules in the Central Processing Unit (CPU) 112 which may communicate to plurality of base stations (110) which may further communicate to the Central Processing Unit (CPU) 112.

The processor 102, returns output by accepting signals, such as electrical signals as input. In one embodiment, processor 102 may include one or more processing units Processor(s) may be implemented as appropriate in hardware, computer-executable instructions, firmware, or combinations thereof. Computer-executable instruction or firmware implementations of the processor 102 may include computer-executable or machine-executable instructions written in any suitable programming language to perform the various functions described.

The memory units/devices 104 may store data and program instructions that are loadable and executable on processor(s) 102 as well as data generated during the execution of these programs. The memory may be volatile, such as random-access memory and/or a disk drive or non-volatile memory.

One or more base stations 110 from one or more cells may be configured to communicate with the processor 102. Communication is enabled by the communication module 106. The processor 102 receives signals from the base stations 110 and communicates the signals to the IRC unit 108, where the interference of the received signal is suppressed and the signal to noise ratio (SNR) is maximized.

The IRC unit 108 is configured to receive instructions from the processor 102. The IRC unit 108 is configured to emulate interferences occurring from one or more user equipments (mobile communicating devices) transmitting data bits using multiple channels. The IRC unit 108 utilizes the characteristics of inter-cell interference to determine the power of the interfering user equipment's which belongs to another cell. Once the pattern and power level is determined, the interfering signal can be reduced/removed from the received signals of the desired user equipment. The IRC unit 108 is further configured to maximize the signal to noise ration of the received signals. IRC unit 108 receives instructions from the processor 102 to suppress interference while maximizing signal to noise ratio (SNR) of the received signals. It may be noted that users may refer to user equipment's as user equipment's are communicating with the base stations which are carried by users.

The IRC unit 108 of the system 100 is configured to estimate the input data bits (signals) received from user equipments at the antennas of the base stations 110. The signals received at the antennas of the base stations 110 may be communicated to the processor 102, where the processor 102 instructs the IRC unit 108 to estimate the input data signal using a Hermitian function. The second function expresses the input data signal "x" as a product of a Hermitian Matrix "$W^H$" and a received signal "Y" at all the antennas of base station 110 as shown below.

$$x = w^H y$$

The output/received signal is expressed as $Y = hx + h_1 x_1 + n$, where h is the channel through which the input signal "x" of the desired user is transmitted and "n" is the noise, h1 is the channel of the interfering user which is transmitting input signal $x_1$. The IRC unit 108 of the system 100 is further configured to compute the Hermitian Matrix "$W^H$" using a Hermitian function as shown below.

$$W^H = h^H R^{-1}$$

where $R = h_1 h_1^H + \Delta^2 I$

R is a covariance matrix corresponding to the interfering user and AWGN (additive white gaussian noise) and $\Delta^2$ is variance of AWGN and I is an identity matrix. The IRC unit 108 of the system 100 is further configured to compute the SNR of the uplink signal which is mentioned in detail in the later concepts pertaining to computing the signal to noise ratios (SNR). The method to improve the signal to noise ratio in different scenarios is explained in detail in further descriptions.

Figure 2A:
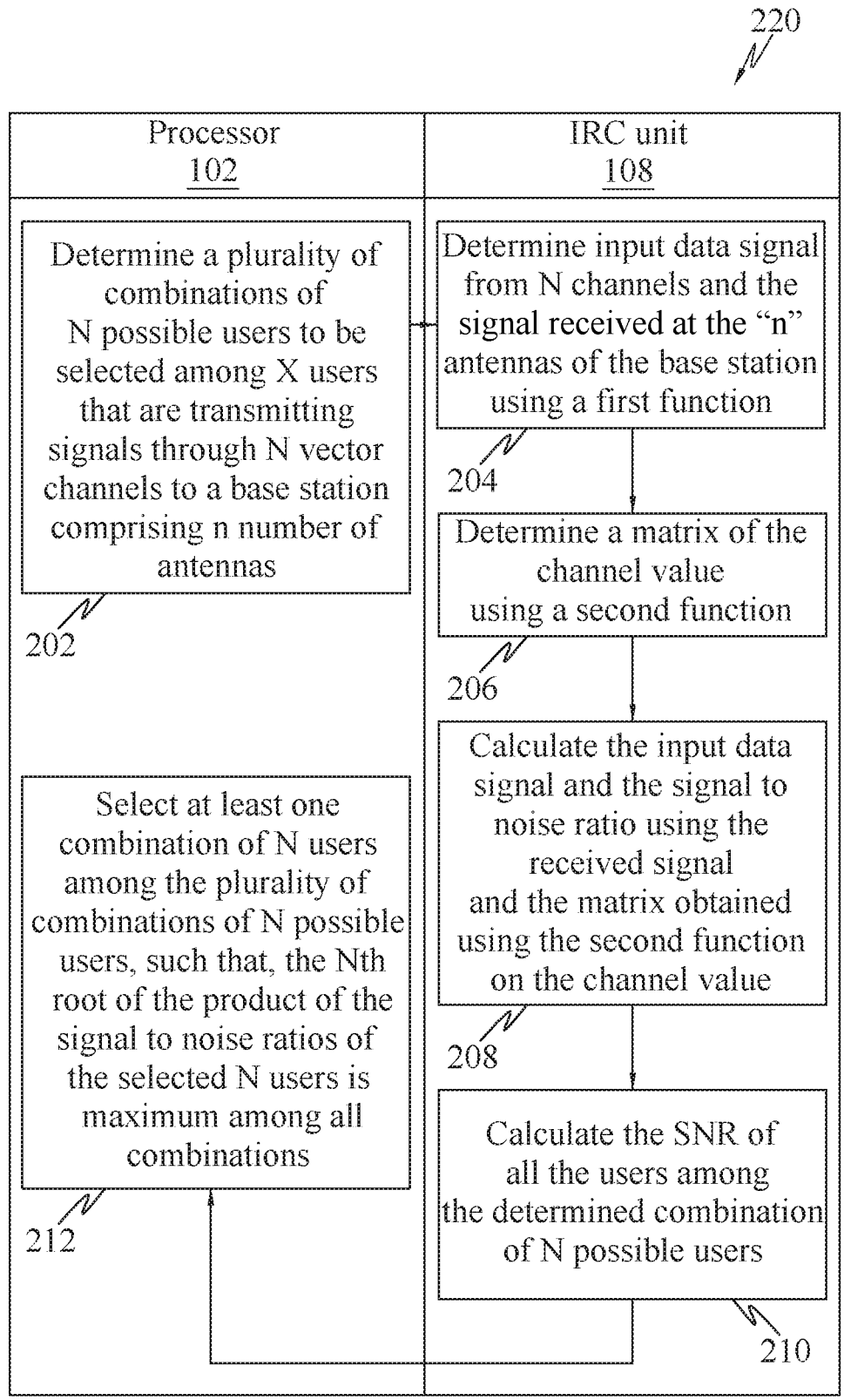
FIG. 2A is a flowchart 220 which illustrates a first exemplary method for improving the SNR of signals in an uplink transmission.

III. First Exemplary Method for Improving SNR-1 Cell, 1 BS, Many Users on Same Sub-Carrier, 1 Antenna/User Referring to FIG. 2A, a flowchart 220 illustrates an exemplary method for improving the SNR of signals in an uplink transmission. In an embodiment, method for improving the SNR of signals in an uplink transmission illustrated in flowchart 220 involves one small cell, one base station within the cell and "X" users (users may refer to user equipment's) associated to the base station. The processor 102 may be configured to select "N" users among X users for which the SNR will be calculated. There are about $^X C_N$ possible combination of N users. The base station may comprise "n" antennas, where generally, though not necessarily, n>=N. The number of "N" user equipment's may be equal to the "n" number of antennas. Each of the N users transmits signal through one vector channel, hence N users transmits using N vector channels. The channel is expressed as a vector comprising one column and n rows corresponding to one user equipment to "n" antennas. Each user transmits uplink signals to base stations on the same frequency subcarrier. Each of the user equipment's may include one transmitting antenna.

At step 202, the processor 102 determines a plurality of combinations of N possible users to be selected among X users that are transmitting signals through N vector channel to a base station comprising n number of antennas. At step 204, input data signal is determined from the N channels and the signals received at the "n" antennas of the base station using an Interference Rejection Combining (IRC) function. The IRC function may be carried out in the IRC unit 108. At step 206, the IRC unit 108, determines a matrix of the channel value using a Hermitian function. The Hermitian function may be a function that computes a Hermitian Matrix from the channel vector, where the channel vector is a matrix comprising one column and n rows. The output matrix of the Hermitian function or the Hermitian matrix may be an n column and one row matrix. At step 208, the IRC unit 108 calculates the input data signal using the received signal and the matrix obtained using the IRC function on the channel value and the signal to noise ratio (SNR) using the channel vector. At step 210, the IRC unit 108 calculates the SNR of all users among the determined combination of N possible users. At step 212, the processor 102 selects at least one combination of N users among the plurality of combinations of N possible users, such that, the $N^{th}$ root of the product of the signal to noise ratios (SNR) of the selected N users is maximum among all combinations.

Figure 2B:
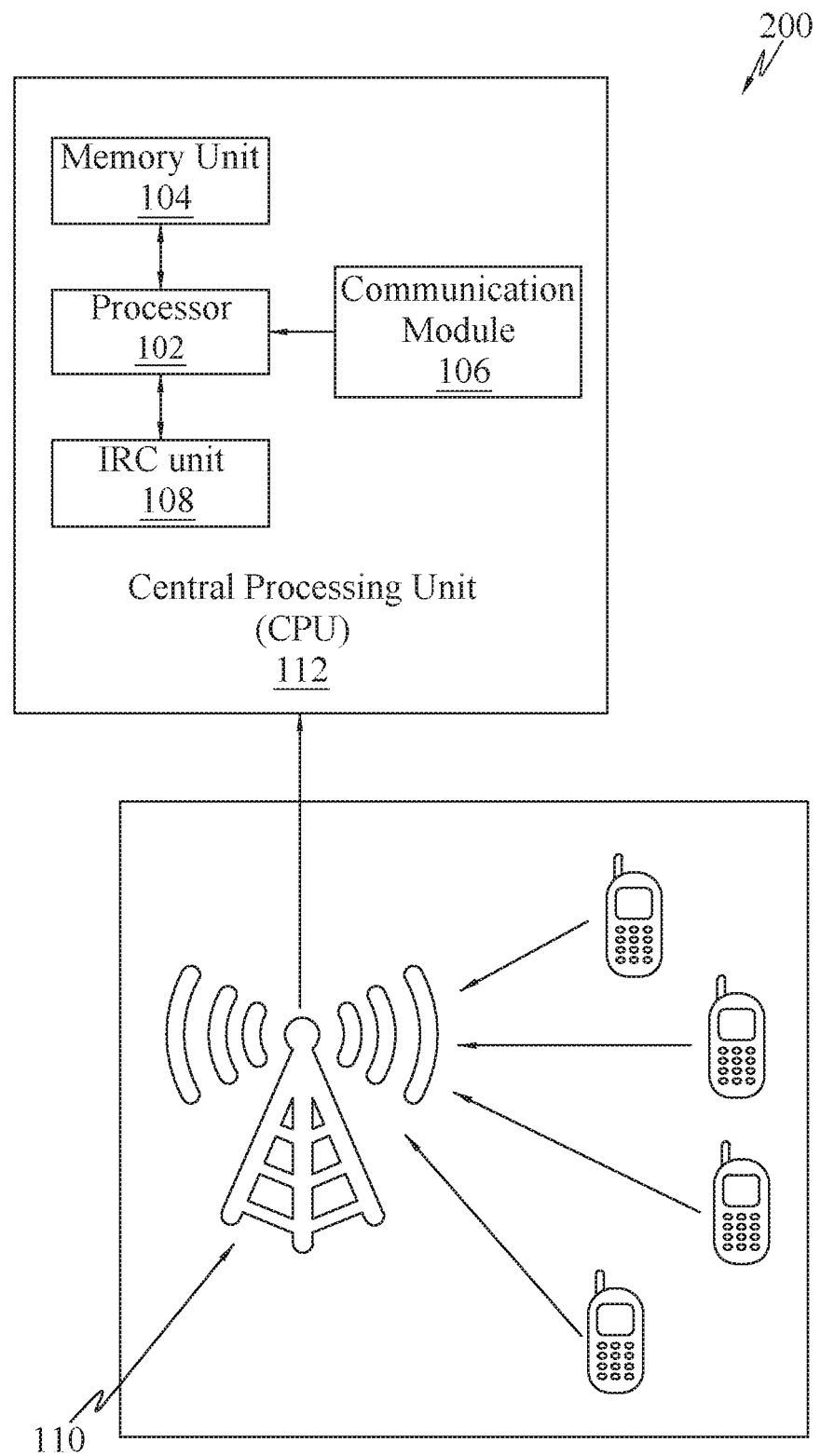
FIG. 2B is a first exemplary system 200, comprising 1 Cell, 1 Base station (BS), many users/BS and 1 Antenna/User, for improving the SNR of signals in an uplink transmission.

Referring to FIG. 2B, an exemplary system 200 for improving the SNR of signals in an uplink transmission. FIG. 2B illustrates a system 100 including one cell and one base station within the cell. As an example, let's assume, the base station 110 comprises 4 antennas (not shown) in the figure. The base station 110 may be associated with 10 users. The processor 102 may be configured to select at least 4 users among the 10-user equipment's, such that each of the 4 users transmits through one vector channel to all the 4 antennas of the base station 110 at the same time on the same subcarrier. There may be $^{10}C_4$ i.e. 210 ways in which 4 users may be selected among 10 users.

The processor 102 instructs the IRC unit 108 to estimate the input data signal using a second function. The base station may receive 4 bits of data at each antenna through 4 scalar channels such that one user equipment transmits 1 bit of data. Let the users be denoted by "i", "j", "k", "l" such that the selected users are the $i^{th}$, $j^{th}$, $k^{th}$ and the $l^{th}$ users in the base station 110. Let the input signal transmitted by the $i^{th}$ user be $x_i$, input signal transmitted by the $j^{th}$ user be $x_j$, input signal transmitted by the $k^{th}$ user be $x_k$ and input signal transmitted by the $j^{th}$ user be $x_l$. Likewise, let the output signal received at all the four antennas of base station 110 be Y.

The IRC function expresses the input data signals "$x_i$" as the product of a Hermitian Matrix "$W_i^H$" and a received signal Y, "$x_j$" as the product of a Hermitian Matrix "$W_j^H$" and a received signal Y, "$x_k$" as the product of a Hermitian Matrix "$W_k^H$" and a received signal Y and "$x_l$" as the product of a Hermitian Matrix "$W_l^H$" and a received signal "Y" across all the four antennas of the base station 110 as shown below.

$$x_i = W_i^H Y$$

$$x_j = W_j^H Y$$

$$x_k = W_k^H Y$$

$$x_l = W_l^H Y$$

The IRC unit 108 of the system 100 is further configured to compute the Hermitian matrices "$W_i^H$", $W_j^H$, $W_k^H$ and $W_l^H$ using the first function as shown below.

$$W_i^H = h_i^H R_i^{-1}$$

$$W_j^H = h_j^H R_j^{-1}$$

$$W_k^H = h_k^H R_k^{-1}$$

Let the 4 channels used by the 4 users be denoted by $h_i$, $h_j$, $h_k$, $h_l$ corresponding to all the "n" antennas comprising n rows and one column. The SNRs of the signals received from user equipments of the "i", "j", "k" and "l" users are respectively denoted by $SNR_i$, $SNR_j$, $SNR_k$ and $SNR_l$. The signal to noise ratios $SNR_i$, $SNR_j$, $SNR_k$ and $SNR_l$ may be expressed using the equation as provided below, $$SNR_i = h_i^H R_i^{-1} h_i, \text{ where } R_i = h_j h_j^H + h_k h_k^H + h_l h_l^H + \Delta^2 I$$

$$SNR_j = h_j^H R_j^{-1} h_j, \text{ where } R_j = h_i h_i^H + h_k h_k^H + h_l h_l^H + \Delta^2 I$$

$$SNR_k = h_k^H R_k^{-1} h_k, \text{ where } R_k = h_i h_i^H + h_j h_j^H + h_l h_l^H + \Delta^2 I$$

$$SNR_l = h_l^H R_l^{-1} h_l, \text{ where } R_l = h_i h_i^H + h_j h_j^H + h_k h_k^H + \Delta^2 I$$

where $\Delta^2$ is the variance of AWGN (additive white gaussian noise) variance, $R_i$, $R_j$, $R_k$ and $R_l$ are covariance matrices for all the user equipments and I is 4×4 identity matrix.

The processor 102 is configured to calculate SNRs of each user among the 4 possible users in the 210 combinations. The processor 102 selects at least one combination of 4 users among the plurality of 210 combinations of 4 possible users, such that, the $4^{th}$ root of the product of the signal to noise ratios ($SNR_i$, $SNR_j$, $SNR_k$ and $SNR_l$) of the selected 4 users is maximum among all combinations. In other words, a combination of 4 users among the plurality of 210 combinations of 4 possible users is selected, such that, $$\sqrt[4]{SNR_i SNR_j SNR_k SNR_l}$$

is maximum among all combinations.

The processor 102 is further configured to calculate signal to noise ratio for at least a predetermined number of users in one or more of the plurality of combinations of N users. For example, the processor 102 may calculate SNRs of at least the $i^{th}$ user and the $j^{th}$ user in the 210 combinations of 4 users. In other words, the processor 102 may calculate $SNR_i$, $SNR_j$ to begin with. Further, the processor 102 may be configured to reuse or utilize the computations used for the previously calculated SNRs to compute $$\sqrt[4]{SNR_i SNR_j SNR_k SNR_l}$$

in the subsequent combinations of N possible users. The calculated SNRs are stored within the memory unit 104 of system 100. The above computations are carried out using Woodbury's identity algorithm. A method to compute the signal to noise ratios for the selected users is explained in detail in later concept.

Figure 8:
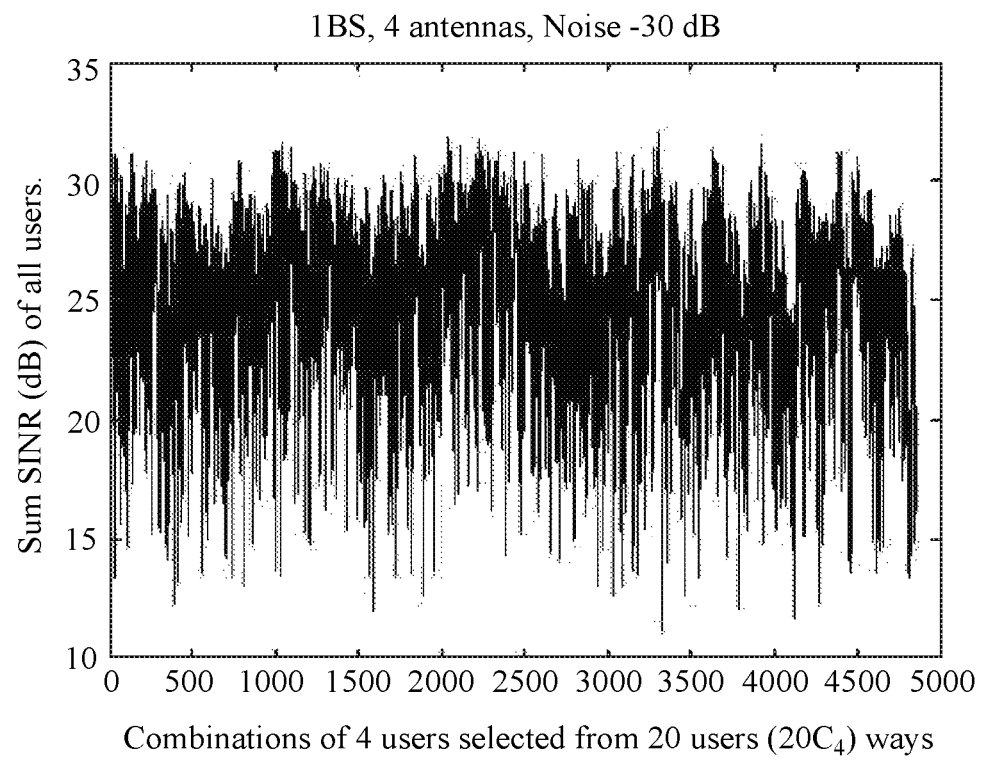
FIG. 8 illustrates a simulation output for the first exemplary system 200.

Referring to FIG. 8, a simulation result for a system comprising a base station comprising 4 antennas wherein each user equipment comprises one antenna. 4 user equipments are selected from 20 user equipments in $^{20}C_4$ ways. The sum SINR of all users in each combination is plotted. As it clearly depicts the sum SINR (refers to SNR) varies from a minimum of 7 dB to a maximum of 30 db. Therefore, it becomes necessary to select the best combination of 4 user equipments in an intelligent way using less complexity.

IV. Second Exemplary Method for Improving SNR-N Cell, N BS, 1 User/BS on a Given Sub-Carrier, 1 Antenna/User Referring to FIG. 3A, a flowchart 320 illustrates an exemplary method for improving the SNR of signals in an uplink transmission. In an embodiment, method for improving the SNR of signals in an uplink transmission illustrated in flowchart involves N small cells, N base stations 110 and "X" users transmitting to the base stations 110. The processor 102 may be configured to select "N" users among X users (users may also refer to user equipment's) such that one user is selected in each cell (X user equipment's may be distributed equally among N cells). There are about $(X/N)^N$ possible combinations of N user equipment's. It may be noted that processor 102 determines the plurality of combinations of N possible users among the X users using $(X_1 * X_2 \ldots X_N)$, where $X_1$ is the number of users in the first base station, $X_2$ is the number of users in the second base station and $X_N$ is the number of users in the Nth base station, where $X_1 + X_2 + \ldots X_N = X$. The base stations may comprise "n" antennas, where generally, though not necessarily, n>=N. The number of "N" user equipment's may be equal to the "n" number of antennas. Each of the N users transmits signals through n*N scalar channels to all the to n*N antennas of all the base stations 110. The channel is expressed as a vector comprising one column and n*N rows. All the user equipments transmit uplink signals to base stations 110 at same frequency subcarrier. The processor 102 determines a plurality of combinations of N possible users to be selected among X users that are transmitting signals through n*N channels to N base stations comprising n number of antennas.

Referring to FIG. 3A, at step 302, X users are associated with a plurality of base stations 110. At step 304, the processor 102 determines a plurality of combinations of N possible users to be selected among the X users, such that each of the N users transmits to all the base stations, each base station comprising n number of antennas. At step 306, the IRC unit 108 determines input data signal of each user equipment by processing signals at each of the n*N antennas of the all the base stations using the IRC function. Each channel value is a single column and n*N row matrix and received signal is a single column and n*N row matrix. At step 308, the IRC unit 108 determines a matrix of the channel using the IRC function, wherein the matrix is a n*N row and single column matrix. At step 310, the IRC unit 108 calculates the input data signal and the signal to noise ratio using the received signal and the n*N row and single column matrix. At step 312, the IRC unit 108 calculates the SNR of all user equipment's among the determined combination of N possible users. At step 314, the processor 102 selects at least one combination of N users among the plurality of combinations of N possible users, such that, the $N^{th}$ root of the product of the signal to noise ratios (SNR) of the selected N users is maximum among all combinations.

Figure 3B:
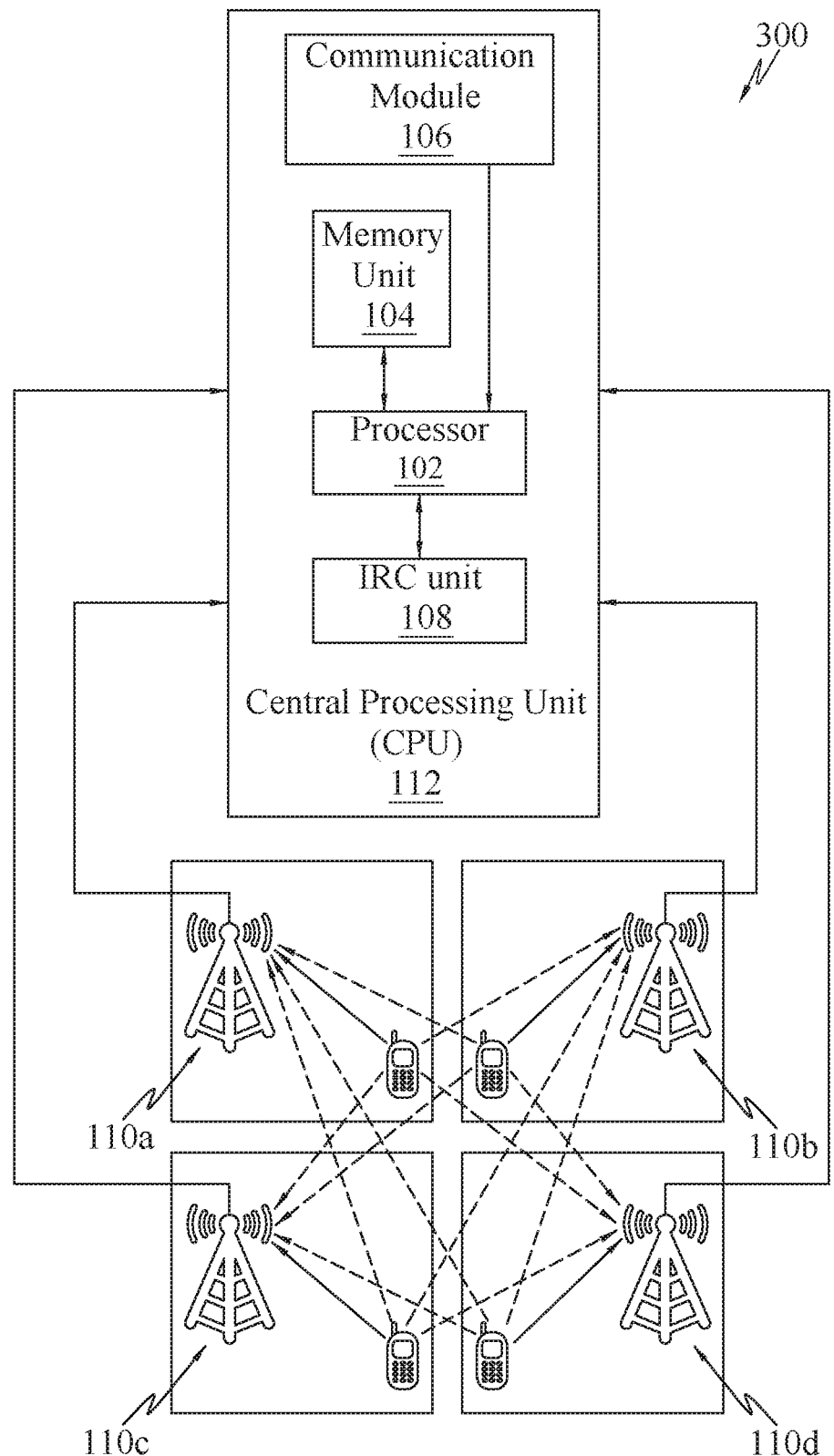
FIG. 3B is a second exemplary system 300 comprising, N cells, N Base stations (BS), 1 User/BS and 1 Antenna/User, for improving the SNR of signals in an uplink transmission.

Referring to FIG. 3B, an exemplary system 300 for improving the SNR of signals in an uplink transmission is illustrated. FIG. 3B illustrates a system 300 including 4 cells and 4 base stations, such that one base station 110 belongs to one cell. Let's assume, the system 300 comprises 4 cells say Cell 1, Cell 2, Cell 3 and Cell 4. Each cell comprises a base station, let's assume there are 4 base stations for 4 cells, say 110a, 110b, 110c and 110d for Cell1, Cell2, Cell3 and Cell4 respectively. Each base station comprises 4 antennas (not shown) in figure. The base stations 110a, 110b, 110c and 110d may be associated with about 10 users in each cell. Each user in one cell may also transmit to all other base station in the other cells. The processor 102 may be configured to select at least 4 user equipment's among the 40 user equipment's (10*4 i.e. there may be 10 user equipment's for each base station and for the four base stations, user equipment's may be 40), such that each of the 4 users transmits through 4*4=16 scalar channels to the base stations 110a, 110b, 110c and 110d at the same time. There may be $10^4$=10000 ways in which 4 users may be selected among 40 user equipment's. It may be noted that each selected user equipment belongs to one unique base station wherein each base station belongs to one cell.

The processor 102 instructs the IRC unit 108 to estimate the input data signal using the Interference Rejection Combining (IRC) function. The base station 110a may receive 4 bits of data at each antenna through 4 scalar channels. In an embodiment, the bits may refer to symbols. One user equipment transmits signal through each of the 16 scalar channels to the 16 antennas of all the N base stations 110. Likewise, all the remaining 3 user equipment's transmit signal through each of the 16 scalar channels to the 16 antennas of all the N base stations 110. Hence, one base station receives data through 16 scalar channels. Similarly, all 4 users may transmit to all base stations 110. Let the users be denoted by "i", "j", "k", "l" such that the selected users are the $i^{th}$, $j^{th}$, $k^{th}$ and the $l^{th}$ users in the base stations 110a, 110b, 110c and 110d respectively. Each $i^{th}$, $j^{th}$, $k^{th}$ and the $l^{th}$ users transmits to all the base stations 110a, 110b, 110c and 110d through 16 scalar channels. Hence, one base station e.g. 110a receives 16 signals or 4 data bits from the $i^{th}$, $j^{th}$, $k^{th}$ and the $l^{th}$ users. It may be noted that number of base stations are N=4 and the number selected users N=4 such that each user is associated with one base station.

Let the input signal transmitted by the $i^{th}$ user be $x_i$, input signal transmitted by the $j^{th}$ user be $x_j$, input signal transmitted by the $k^{th}$ user be $x_k$, and input signal transmitted by the $l^{th}$ user be $x_l$. Let the consolidated channel for $i^{th}$ user from the Cell1 transmitting to all the base stations 110 be $h_i$. Similarly, a consolidated channel for $j^{th}$ user from Cell2 transmitting to all the base stations 110 is denoted by $h_1$, a consolidated channel for $k^{th}$ user from Cell3 transmitting to all the base stations 110 be $h_k$ and a consolidated channel for $l^{th}$ user from Cell4 transmitting to all the base stations 110 be $h_j$. Each of the consolidated channel vectors is a 16×1 matrix.

For the $i^{th}$ user equipment, the second function (Hermitian function) expresses the input data signal $x_i$ as the product of Hermitian Matrix "$W_i^H$" and a received signal "Y", for $j^{th}$ user equipment, the Hermitian function expresses the input data signal $x_j$ as the product of Hermitian Matrix "$W_j^H$" and a received signal "Y", for $k^{th}$ user equipment, the Hermitian function expresses the input data signal $x_k$ as the product of Hermitian Matrix "$W_k^H$" and a received signal "Y", and for the fuser equipment, the Hermitian function expresses the input signal $x_l$ as the product of Hermitian Matrix "$W_l^H$" and a received signal "Y" as shown below.

$$x_i = W_i^H Y$$

$$x_j = W_j^H Y$$

$$x_k = W_k^H Y$$

$$x_l = W_l^H Y$$

where Y is the signal received across 16 antennas of all the four base stations.

The IRC unit 108 of the system 300 is further configured to compute the Hermitian matrices "$W_i^H$", $W_j^H$, $W_k^H$ and $W_l^H$ using the Hermitian function as shown below.

$$W_i^H = H_i^H R_i^{-1}$$

$$W_j^H = H_j^H R_j^{-1}$$

$$W_k^H = H_k^H R_k^{-1}$$

$$W_l^H = H_l^H R_l^{-1}$$

where $R_i = h_j^H h_j^H + h_k^H h_k^H + h_l^H h_l^H + \Delta^2 I$ $$R_j = h_i^H h_i^H + h_k^H h_k^H + h_l^H h_l^H + \Delta^2 I$$

$$R_k = h_i^H h_i^H + h_j^H h_j^H + h_l^H h_l^H + \Delta^2 I$$

$$R_l = h_i^H h_i^H + h_j^H h_j^H + h_k^H h_k^H + \Delta^2 I$$

$\Delta^2$ is AWGN (additive white gaussian noise) variance, $R_i$, $R_j$, $R_k$ and $R_l$ are covariance matrices corresponding to $i^{th}$, $j^{th}$, $k^{th}$ and $l^{th}$ user equipments and I is a 16*16 identity matrix. The SNRs of the $i^{th}$, $j^{th}$, $k^{th}$ and $l^{th}$ user equipments are denoted as $SNR_i$, $SNR_j$, $SNR_k$ and $SNR_l$ may be expressed using the equation as provided below.

$$SNR_i = h_i^H R_i^{-1} h_i$$

$$SNR_j = h_j^H R_j^{-1} h_j$$

$$SNR_k = h_k^H R_k^{-1} h_k$$

$$SNR_l = h_l^H R_l^{-1} h_l$$

Similarly, SNRs of $j^{th}$, $k^{th}$ and $l^{th}$ users transmitting to all the base stations 110a, 110b, 110c and 110d respectively are calculated using the above formula. The processor 102 selects at least one combination of 4 users ($i^{th}$, $j^{th}$, $k^{th}$ and $l^{th}$ users) among the plurality of 10000 combinations of 4 possible users, such that, the $4^{th}$ root of the product of the signal to noise ratios (e.g. $SNR_i$, $SNR_j$, $SNR_k$ and $SNR_l$) of the selected 4 users is maximum among all combinations. In other words, a combination of 4 users among the plurality of combinations is selected, such that, $$\sqrt[4]{SNR_i SNR_j SNR_k SNR_l}$$

is maximum among all combinations.

The processor 102 is further configured to calculate signal to noise ratio for at least a predetermined number of users in one or more of the plurality of combinations of N users. For example, the processor 102 may calculate SNRs of at least the $i^{th}$ user and the $j^{th}$ user in the 10000 combinations of 4 users. In other words, the processor 102 may calculate $SNR_i$, $SNR_j$ to begin with. Further, the processor 102 may be configured to reuse or utilize the previously calculated SNRs to compute $$\sqrt[4]{SNR_i SNR_j SNR_k SNR_l}$$

in the subsequent combinations of N possible users. The calculated SNRs are stored within the memory unit 104 of system 300. The above computations are carried out using Woodbury's identity algorithm. A method to compute the signal to noise ratios for the selected users is explained in detail in later context.

Figure 9:
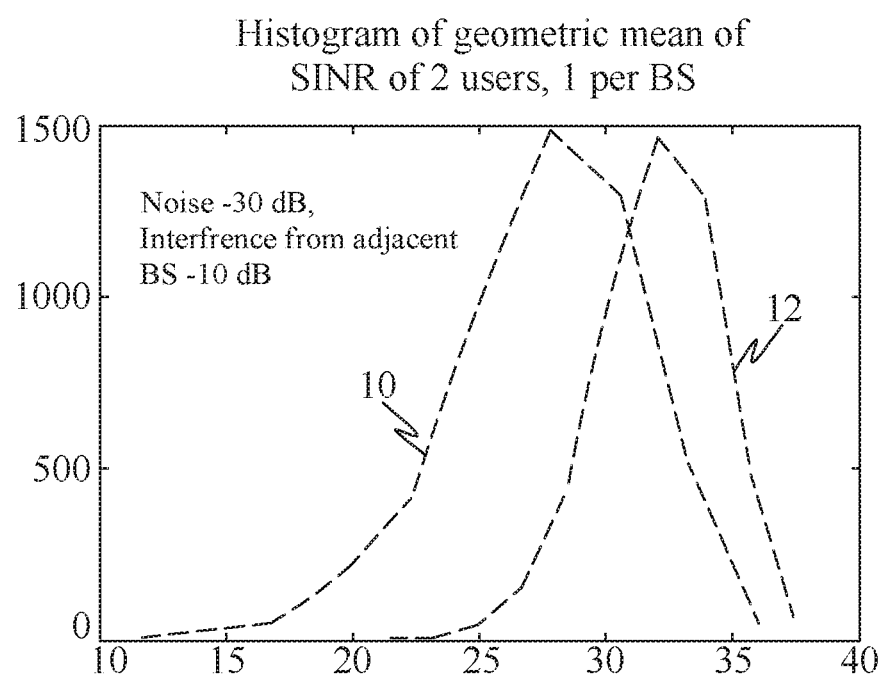
FIG. 9 illustrates a simulation output for the second exemplary system 300.
Figure 10:
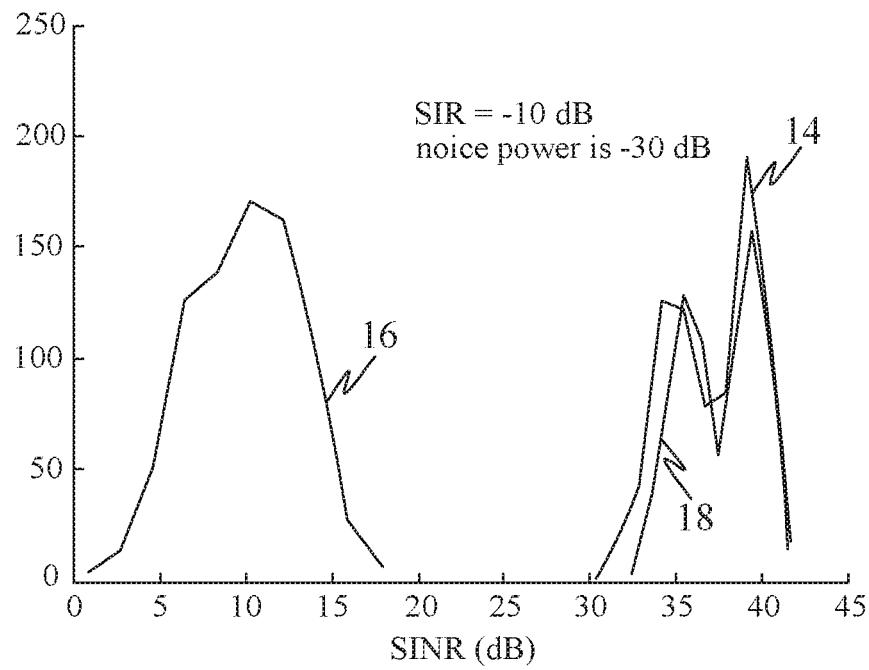
FIG. 10 illustrates a simulation output for the third exemplary system 400.

Referring to FIG. 9, a simulation result for a system comprising 2 base station, wherein each base station comprises 2 antennas. Each user equipment comprises one antenna in each base station. Using the Interference Rejection Combining (IRC) on 2 antennas of each of the base station for each user equipment while considering interference from the other user equipment associated with other base station, a SINR histogram is given by a curve 10. Using IRC on 4 antennas of both the base stations for each user equipment while considering interference from the other user equipment associated with the other base station, the SINR histogram is given by a curve 12. The curve is a simulation result for the proposed method.

V. Third Exemplary Method for Improving SNR-N Cell, N BS, 1 User/Bs on a Given Subcarrier, 2 Antennas/User Referring to FIG. 4A, a flowchart 420 illustrates another exemplary method for improving the SNR of signals in an uplink transmission. In an embodiment, method for improving SNR of signals in an uplink transmission illustrated in flowchart 420 involves N small cells, N base stations 110, such that one base station 110 belongs to one cell. "X" users may be equally distributed among N base stations 110.

The processor 102 may be configured to select "N" users among X users for which the SNRs may be calculated (X user equipment's may be distributed equally among N cells) wherein each user belongs to one base station. There are about $(X/N)^N$ possible combination using which N users are selected. It may be noted that processor 102 determines the plurality of combinations of N possible users among the X users using $(X_1*X_2...X_N)$, where $X_1$ is the number of users in the first base station, $X_2$ is the number of users in the second base station and $X_N$ is the number of users in the Nth base station, where $X_1+X_2+...X_N=X$. Each base station 110 may comprise "n" antennas, where generally, though not necessarily, n>=N. The number of "N" user equipment's may be equal to the "n" number of antennas. Each of the N users transmits signals to each of the base stations 110. Each of the user equipment's may transmit through two antennas. Hence one base station 110 receives signals through 2nscalar channels. Each of the N users transmits using 2 antennas to the n*N antennas of all the base stations. Each of the base stations may receive signal from one user equipment through 2nchannels. The vector channel of each user to all the antennas of all the base station is expressed as a matrix comprising two columns and n*N rows. All users transmit uplink signals to base stations 110 on same subcarrier. Each of the user equipment's uses transmit precoders for multi-antenna transmission. It may be noted that each of the N users belong to each of the N base stations.

Figure 4A:
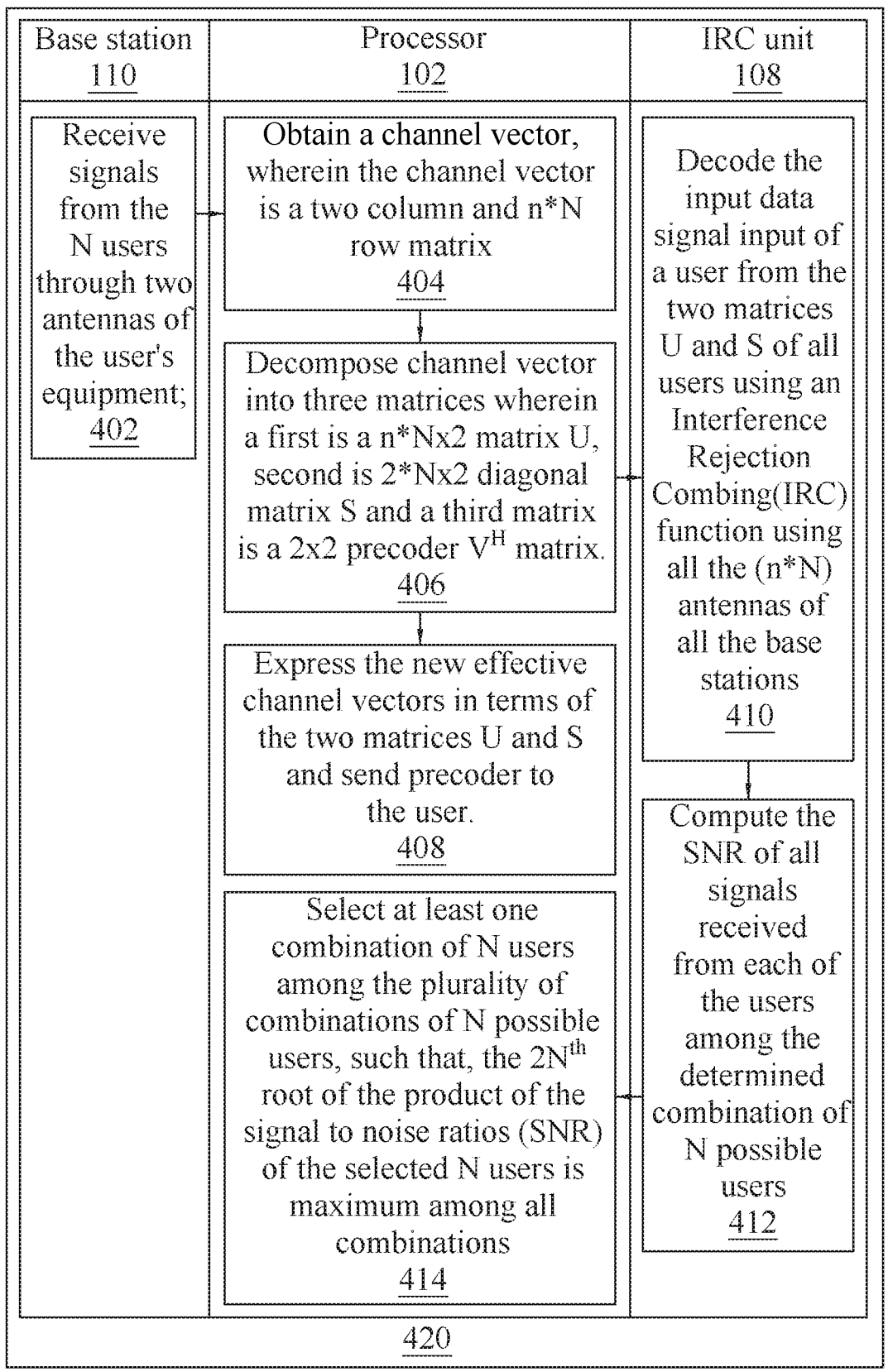
FIG. 4A is a flowchart 420 which illustrates third exemplary method for improving the SNR of signals in an uplink transmission.

Referring to FIG. 4A, at step 402, a plurality of base stations, each comprising n antennas, receives signals from the N users, through at least two antennas of each of the users' equipment. The signals are transmitted to the processor 102. At step 404, the processor 102 obtains a channel vector which is a channel from user equipment to all the n*N antennas of N base stations, wherein the channel vector is a n*N row and 2 column matrices. At step 406, the channel vector is decomposed to obtain three matrices using Singular Value Decomposition (SVD) wherein first is a n*N×2matrix, second is a 2×2 diagonal matrix and third matrix is a 2*2 precoder matrix. The n*N×2 matrix is denoted by "U", the 2×2 diagonal matrix is denoted by S and the 2×2 precoder matrix is denoted by $V^H$ where V is sent to the user and the user uses it as precoder before transmission. At step 408, the processor 102 expresses the new effective channel vectors as the product of the two matrices U and S and sends transmit precoder V to user equipment. It may be noted that the processor 102 expresses for each user as two pseudo users with effective channel vector as first and second column of product of U and S. At step 410, the IRC unit 108 decodes the input data signal input of a user equipment from the two matrices U and S of all the user equipment's using an Interference Rejection Combining (IRC) function. At step 412, the IRC unit 108 calculates the SNR of all user equipment's. At step 414, the processor 102 selects at least one combination of N users among the plurality of combinations of N possible users, such that, the $2N^{th}$ root (each of the N user equipment's having 2 antennas) of the product of the signal to noise ratios (SNR) of the selected N users is maximum among all combinations.

Figure 4B:
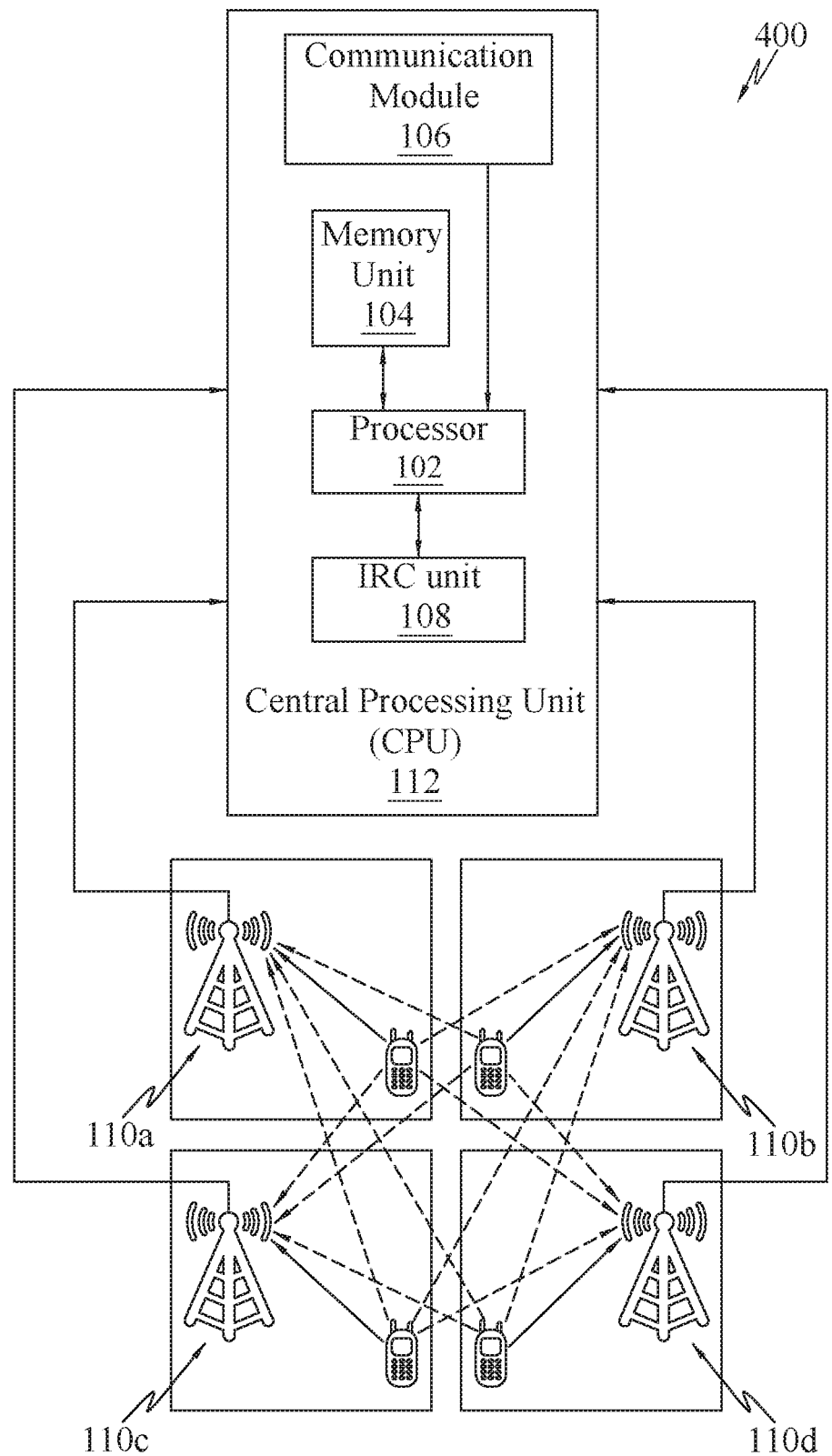
FIG. 4B is third exemplary system 400, comprising N cells, N Base stations (BS), 1 User/BS, 2 Antennas/User, for improving the SNR of signals in an uplink transmission.

Referring to FIG. 4B, an exemplary system 400 for improving the SNR of signals in an uplink transmission. FIG. 4B illustrates a system 400 including 4 cells and 4 base stations 110a, 110b, 110c and 110d within the 4 cells, such that each base station belongs to one cell. As an example, let's assume, the base station 110a comprises 4 antennas (not shown) in the figure. The base station 110a may be associated with 10 user equipment's. The processor 102 may be configured to select at least 4 users among the 40 user equipment's (10*4 i.e. there may be 10 user equipment's for each base station and for the four base stations user equipment's may be 40), one user from each base station 110.

Each user equipment has at least two transmitting antennas, such that each of the 4 users transmit two uplink signals through two channels to the 4 antennas of each of the base stations 110a, 110b, 110c and 110d at the same time. There may be $10^4$ i.e. 10000 ways in which 4 users may be selected among 40 user equipment's.

Let the users be denoted by "i", "j", "k", "l" such that the selected users are the $i^{th}$ user in the first cell, $j^{th}$ user in the second cell, $k^{th}$ user in the third cell and the $l^{th}$ user in the fourth cell. Each of the $i^{th}$ user, $j^{th}$ user, $k^{th}$ user and $l^{th}$ user transmits two signals (two bits) through 32 (16*2) scalar channels to 16 antennas of all the base station 110a, 110b, 110c, 110d respectively. Let the input signal transmitted by the $i^{th}$ user be $x_i$, input signal transmitted by the $j^{th}$ user be $x_j$, input signal transmitted by the $k^{th}$ user be $x_k$ and input signal transmitted by the $l^{th}$ user be $x_l$, $x_i$ may be expressed as $x_{i1}$, $x_{i2}$, $x_j$ may be expressed as $x_{j1}$, $x_{j2}$, $x_k$ may be expressed as $x_{k1}$, $x_{k2}$ and $x_l$ may be expressed as $x_{l1}$, $x_{l2}$ Let the output signal received at all the antennas of all the base stations be Y where the received signal Y is a 16*1 matrix. Further, let's assume that the channel used by the $i^{th}$ user in the first cell is $h_i$, the channel used by the $j^{th}$ user in the second cell is $h_j$, the channel used by the $k^{th}$ user in the third cell is $h_k$ and the channel used by the $l^{th}$ user in the fourth cell is $h_l$. Each of $h_i$, $h_j$, $h_k$ and $h_l$ is a 2 column16 row matrix (16*2 matrix, as the 16*2 channels transmit input from two antennas of the user equipment to 16 antennas of the four base stations 110). In other words, $h_i$ may be expressed as $h_{i1}$, $h_{i2}$, $h_j$ may be expressed as $h_{j1}$, $h_{j2}$, $h_k$ may be expressed as $h_{k1}$, $h_{k2}$ and $h_l$ may be expressed as $h_{l1}$, $h_{l2}$.

The output/received signal across all 16 antennas of four base stations 110a, 110b, 110c and 110d is expressed as $Y=h_i x_i+h_j x_j+h_k x_k+h_l x_l$ In an embodiment, the processor 102 is configured to decompose the 16×2 channel matrix into three matrices using singular value decomposition or SVD. A first matrix may be a 16*2 matrix, a second matrix S may be a 2*2 matrix and a third matrix may be a 2*2 matrix. The decomposition outputs are provided below.

$$SVD(h_i)=U_i S_i V_i^H$$

$$SVD(h_j)=U_j S_j V_j^H$$

$$SVD(h_k)=U_k S_k V_k^H$$

$$SVD(h_l)=U_l S_l V_l^H$$

where $U_i=[U_{i1}, U_{i2}]$ and Si is a diagonal matrix with $S_{i1}$ and $S_{i2}$ as diagonal elements.

Similarly, $U_j$, $U_k$ and $U_l$ may be defined.

where $U_i$, $U_j$, $U_k$, $U_l$ is used by the processor 102 and $V_i$, $V_j$, $V_k$, $V_l$ are precoder values to be sent to the two-antenna transmitter of the user equipment. $S_i$, $S_j$, $S_k$, $S_l$ are diagonal matrices. $\overline{h_{i1}}$, $\overline{h_{j1}}$, $\overline{h_{k1}}$, $\overline{h_{l1}}$ are the new effective channel matrices which are expressed in terms of U and S. The precoder value V is sent to the transmitter. The new effective channel matrices are expressed as provided, $\overline{h_{i1}}=U_{i1} S_{i1}$, $\overline{h_{i2}}=U_{i2} S_{i2}$, $\overline{h_{j1}}=U_{j1} S_{j1}$, $\overline{h_{j2}}=U_{j2} S_{j2}$, $\overline{h_{k1}}=U_{k1} S_{k1}$, $\overline{h_{k2}}=U_{k2} S_{k2}$, $\overline{h_{l1}}=U_{l1} S_{l1}$, $\overline{h_{l2}}=U_{l2} S_{l2}$.

The output/received signal across all 16 antennas with the new effective channel matrices of four base stations 110a, 110b, 110c and 110d is:

$$Y = \overline{h_{i1}} x_{i1} + \overline{h_{i2}} x_{i1} + \overline{h_{j1}} x_{j1} \overline{h_{j2}} x_{j2} + \overline{h_{k1}} x_{k1} + \overline{h_{k2}} x_{k2} + h_{l1} x_{l1} + h_{l2} x_{l2}$$

$$Y = U_{i1} S_{i1} x_{i1} + U_{i2} S_{i2} x_{i2} + U_{j1} S_{j1} x_{j1} + U_{j2} S_{j2} x_{j2} + U_{k1} S_{k1} x_{k1} + U_{k2} S_{k2} x_{k2} + U_{l1} S_{l1} x_{l1} + U_{l2} S_{l2} x_{l2}$$

The input data bits $x_{i1}, x_{i2}, X_{j1}, X_{j2}, X_{k1}, X_{k2}, X_{l1}, x_{l2}$ can be decoded from the relation as provided below.

$$x_{i1} = W_{i1}^H Y$$

$$x_{i2} = W_{i2}^H Y$$

$$x_{j1} = W_{j1}^H Y$$

$$x_{j2} = W_{j2}^H Y$$

$$x_{k1} = W_{k1}^H Y$$

$$x_{k2} = W_{k2}^H Y$$

$$x_{l1} = W_{l1}^H Y$$

$$x_{l2} = W_{l2}^H Y$$

The IRC unit 108 of the system 400 computes the Hermitian matrices $W_{i1}^H, W_{i2}^H, W_{j1}^H, W_{j2}^H, W_{k1}^H, W_{k2}^H, W_{l2}^H, W_{l2}^H$ and $W_{12}^H$ using the first function as shown below.

$$W_{j1}^H = \overline{h_{j1}}^H R_{j1}^{-1}$$

$$W_{j2}^H = \overline{h_{j2}}^H R_{j2}^{-1}$$

where $R_{j1}^{-1} = (R - \overline{h_{j1}} \overline{h_{j1}}^H)^{-1}, R_{j2}^{-1} = (R - \overline{h_{j2}} \overline{h_{j2}}^H)^{-1}$ $$W_{j1}^H = \overline{h_{j1}}^H R_{j1}^{-1}$$

$$W_{j2}^H = \overline{h_{j2}}^H R_{j2}^{-1}$$

where $R_{i1}^{-1} = (R - \overline{h_{i1}} \overline{h_{i1}}^H)^{-1}, R_{i2}^{-1} = (R - \overline{h_{i2}} \overline{h_{i2}}^H)^{-1}$ $$W_{k1}^H = \overline{h_{k1}}^H R_{k1}^{-1}$$

$$W_{k2}^H = \overline{h_{k2}}^H R_{k2}^{-1}$$

where $R_{k1}^{-1} = (R - \overline{h_{k1}} \overline{h_{k1}}^H)^{-1}, R_{k2}^{-1} = (R - \overline{h_{k2}} \overline{h_{k2}}^H)^{-1}$ $$W_{l1}^H = h_{l1}^H R_{l1}^{-1}$$

$$W_{l2}^H = h_{l2}^H R_{l2}^{-1}$$

where $R_{l1}^{-1} = (R - \overline{h_{l1}} \overline{h_{l1}}^H)^{-1}, R_{l2}^{-1} = (R - \overline{h_{l2}} \overline{h_{l2}}^H)^{-1}$ where R is given by the equation given below:

$$R = h_{i1} h_{i1}^H + h_{i2} h_{i2}^H + h_{j1} h_{j1}^H + h_{j2} h_{j2}^H + h_{k1} h_{k1}^H + h_{k2} h_{k2}^H + h_{l1} h_{l1}^H + h_{l2} h_{l2}^H + \Delta^2 I$$

where $\Delta^2$ is AWGN (additive white gaussian noise) variance, $R_{i1}, R_{i2}, R_{j1}, R_{j2}, R_{k1}, R_{k2}, R_{l1}, R_{l2}$ are covariance matrices corresponding to $i^{th}, j^{th}, k^{th}$ and $l^{th}$ user equipments comprising two antennas each and I is 16*16 identity matrix.

The SNRs of the signals received from each of the two antennas of the user equipment's of the "i", "j", "k" and "l" users are respectively denoted by $SNR_{i1}, SNR_{j1}, SNR_{k1}$ and $SNR_{l1}, SNR_{i2}, SNR_{j2}, SNR_{k2}$ and $SNR_{l2}$ which are computed by the relation expressed below:

$$SNR_{i1} = \overline{h_{i1}}^H R_{i1}^{-1} \overline{h_{i1}}, SNR_{i2} = \overline{h_{i2}}^H R_{i2}^{-1} \overline{h_{i2}}$$

Likewise using the above relation $SNR_{j1}, SNR_{j2}, SNR_{k1}, SNR_{k2}, SNR_{l1}, SNR_{l2}$ can be computed. The processor 102 is configured to select at least one combination of 4 users among the plurality of 10000 combinations of 4 possible users, such that, the $8^{th}$ root (each of the 4 user equipments has two antennas) of the product of the signal to noise ratios (e.g. $SNR_{i1}, SNR_{j1}, SNR_{k1}$ and $SNR_{l1}, SNR_{i2}, SNR_{j2}, SNR_{k2}$ and $SNR_{l2}$) of the selected 4 users is maximum among all combinations. In other words, a combination of 4 users among the plurality of 10000 combinations of 4 possible users is selected, such that, $$\sqrt[8]{SNR_{i1} SNR_{j1} SNR_{k1} SNR_{l1} SNR_{i2} SNR_{j2} SNR_{k2} SNR_{l2}}$$

is maximum among all combinations.

The processor 102 is further configured to calculate signal to noise ratio for at least a predetermined number of users in one or more of the plurality of combinations of N users. For example, the processor 102 may calculate SNRs of at least the $i^{th}$ user and the $j^{th}$ user in the 10000 combinations of 4 users. In other words, the processor 102 may calculate $SNR_i$, $SNR_j$ to begin with. Further, the processor 102 may be configured to reuse or utilize the previously calculated SNRs (i.e. $SNR_i$, $SNR_j$) to compute $$\sqrt[4]{SNR_i SNR_j SNR_k SNR_l}$$

in the subsequent combinations of N possible users. The calculated SNRs are stored within the memory unit 104 of system 400. The above computations are discussed in detail in later concepts and are carried out using Woodbury's identity algorithm. The above method to compute the signal to noise ratios is discussed in detail later.

Figure 11:
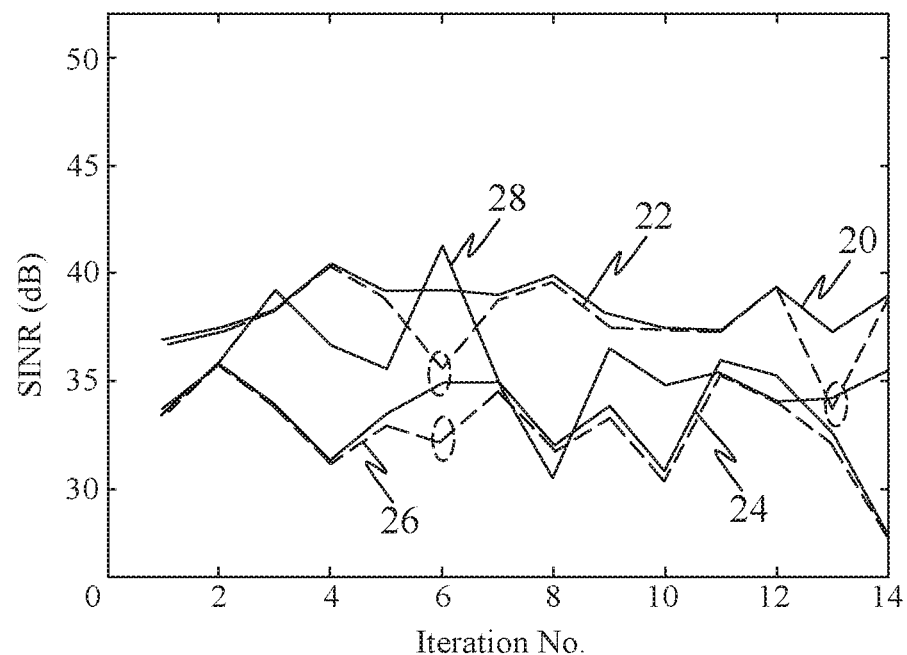
FIG. 11 illustrates a simulation output for accommodating more users in a cell.

Referring to FIG. 11, a simulation result for a system comprising 4 base stations, wherein each base station comprises 4 antennas. Each user equipment comprises two antennas in each base station. A curve 14 is a SVD-based conventional MIMO receiver at the 4 antennas of each base station for its associated user equipment when interference from other users in other base stations is absent. A curve 16 a SVD-based conventional MIMO receiver at 4 antennas of each base station for its own user when interference from other users in other base stations are present. A curve 18 illustrates the proposed method for the third exemplary system.

VI. Accommodating More than One Users in a Cell on the Same Subcarrier

Figure 5A:
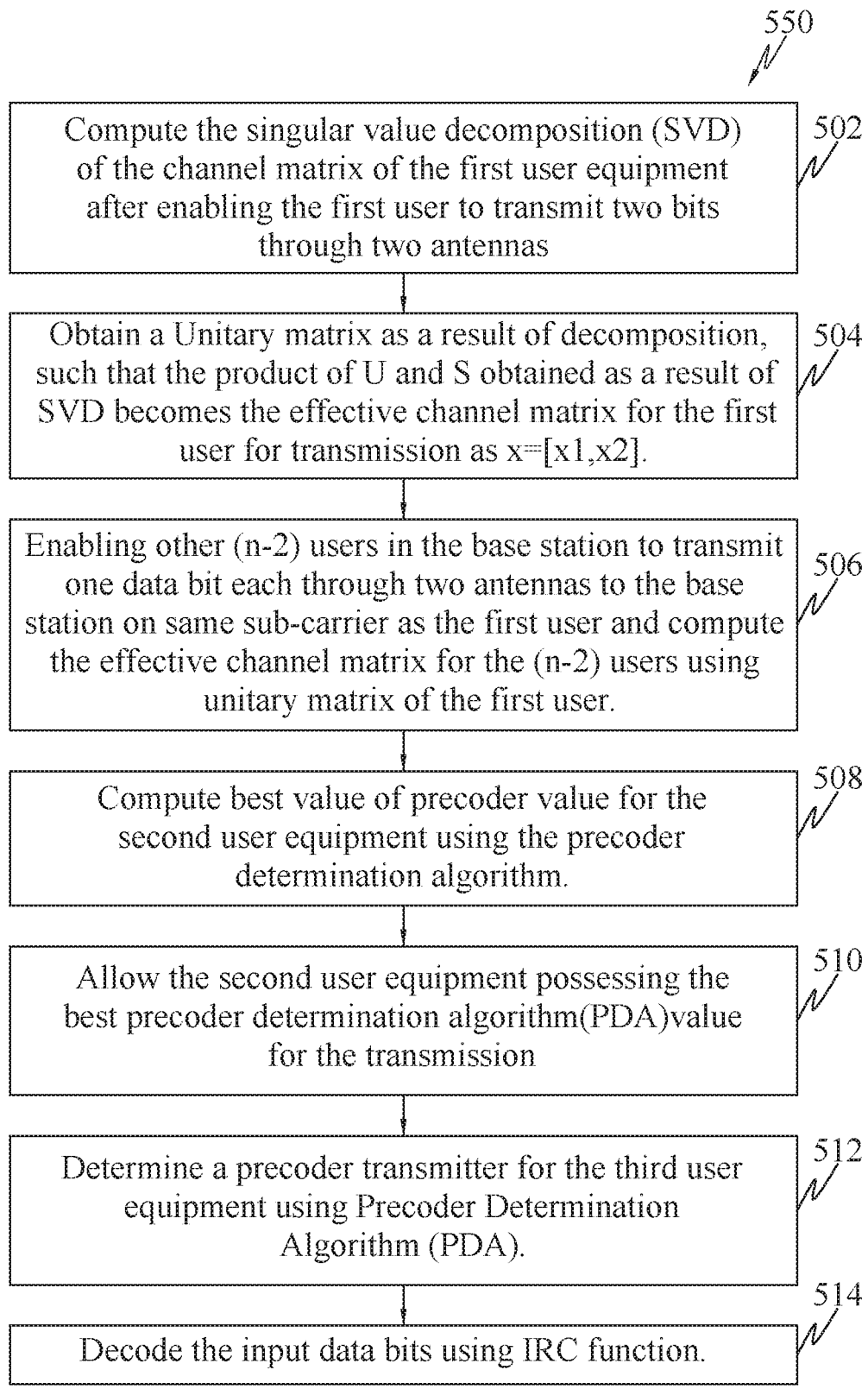
FIG. 5A is a flowchart 550 which illustrates a method for mitigating the loss in an uplink transmission and increase the overall signal to noise ratio.

Multiple users may be transmitting to a base station within a cell on the same subcarrier. The uplink subcarrier is shared among multiple users transmitting signals at the same time. Hence, there may be loss of signal in the uplink transmission and the spectral efficiency of the system 100 may be reduced. Referring to FIG. 5A, a method for mitigating the loss in an uplink transmission and increase the overall signal to noise ratio of the system 100 is provided. A flowchart 550 illustrates an exemplary method for mitigating the loss in an uplink transmission and increase the overall spectral efficiency of the system 100.

The processor 102 is configured to add N users among a plurality of X users such that N users transmit bits equal to or less than the number of antennas "n" of a base station 110. The processor 102 is configured to decode the data bits of each of the selected users received at the "n" antennas.

In an embodiment, method to reduce the loss, illustrated in flowchart, involves one small cell, one base station 110 within the cell and "n" antennas per base station 110. "X" user equipment's are associated with the base station 110. These "X" users may belong to the cell to which the base station 110 belongs. The system 100 accommodates, in each of the base stations 110, one or more user equipments transmitting on the same subcarrier such that transmission of uplink signals by one user equipment does not result in significant loss of performance of the other user equipment's transmitting on the same subcarrier.

The processor 102 is configured to compute the singular value decomposition (SVD) of the signal transmitted by the existing or first user equipment to the base station 110 through a channel "$h_1$", such that $h_1=[U_1 S_1 V_1^H]$, where $U_1$ $S_1$ and $V_1^H$ are 4*4, 4*2 and 2*2 matrices respectively assuming there may be four antennas of base stations. The processor 102 is further configured to determine a precoder determination algorithm (PDA) values (V) for each of the additional users using the relation $$[V,\Theta]=\psi[U,h,k]$$

where V is a precoder matrix, $\Theta$ is a scalar value, U is a unitary matrix, h is channel matrix, k is a scalar value between 3 and number of columns of unitary matrix U. The precoder determination algorithm (PDA) is computed as expressed below.

$U_1$ is determined by the $k^{th}$ column of the unitary matrix U which is followed by computing the value of m which is given as expressed below:

$$M = u_1 u_1^H$$

where $u_1$ is represents the kth column of the Unitary Matrix U and $u_1^H$ is Hermitian function of $u_1$. Further, the processor 102 computes the eigen vector $v_1$ of M with the highest eigen value such that it maximizes $$\frac{v_1^H M v_1}{v_1^H v_1}$$

by using Rayleigh-Ritz Ratio theorem. The value of Vp is computed by using relation as expressed below.

$$V_p = (h_H h)^{-1} h^H v_1$$

where h is channel matrix and $h^H$ is Hermitian function of channel matrix h and $v_1$ is the eigen vector of M corresponding to the with largest eigen value.

$$V = \frac{Vp\sqrt{n}}{Vp^H Vp}$$

where Vp corresponds to the above computed value of V with n as number of transmit antennas. The processor 102 is configured to compute the value of $\Theta$ which is given by the relation as given below.

$$\Theta = \frac{V_{max}^H M V_{max}}{V_{max}^H V_{max}}$$

Where $V_{max}$ corresponds to eigen vector $v_1$ of M with the highest eigen value such that it maximizes the ratio $$\frac{v_1^H M v_1}{v_1^H v_1}$$

by using Rayleigh-Ritz Ratio theorem

"k" is a scalar value which indicates the $3^{rd}$ and the $4^{th}$ columns of the 4×4 input data matrix $U_1$. The processor 102 is configured to select "k" in such a way that $h_2$ $V_2$ has the best alignment with the third or fourth column of the input signal matrix $U_1$. The processor 102 is configured to compute the best value of "$V_2$" using a precoder determination algorithm (PDA). It selects the best "$V_2$" for the second user equipment which is computed using precoder determination algorithm (PDA), which decides the signal of the respective user to be allowed for the transmission to the base station 110. The data bits received across the n antennas of the base station is decoded. Further the IRC unit calculates the SNR of the received signals.

Figure 5B:
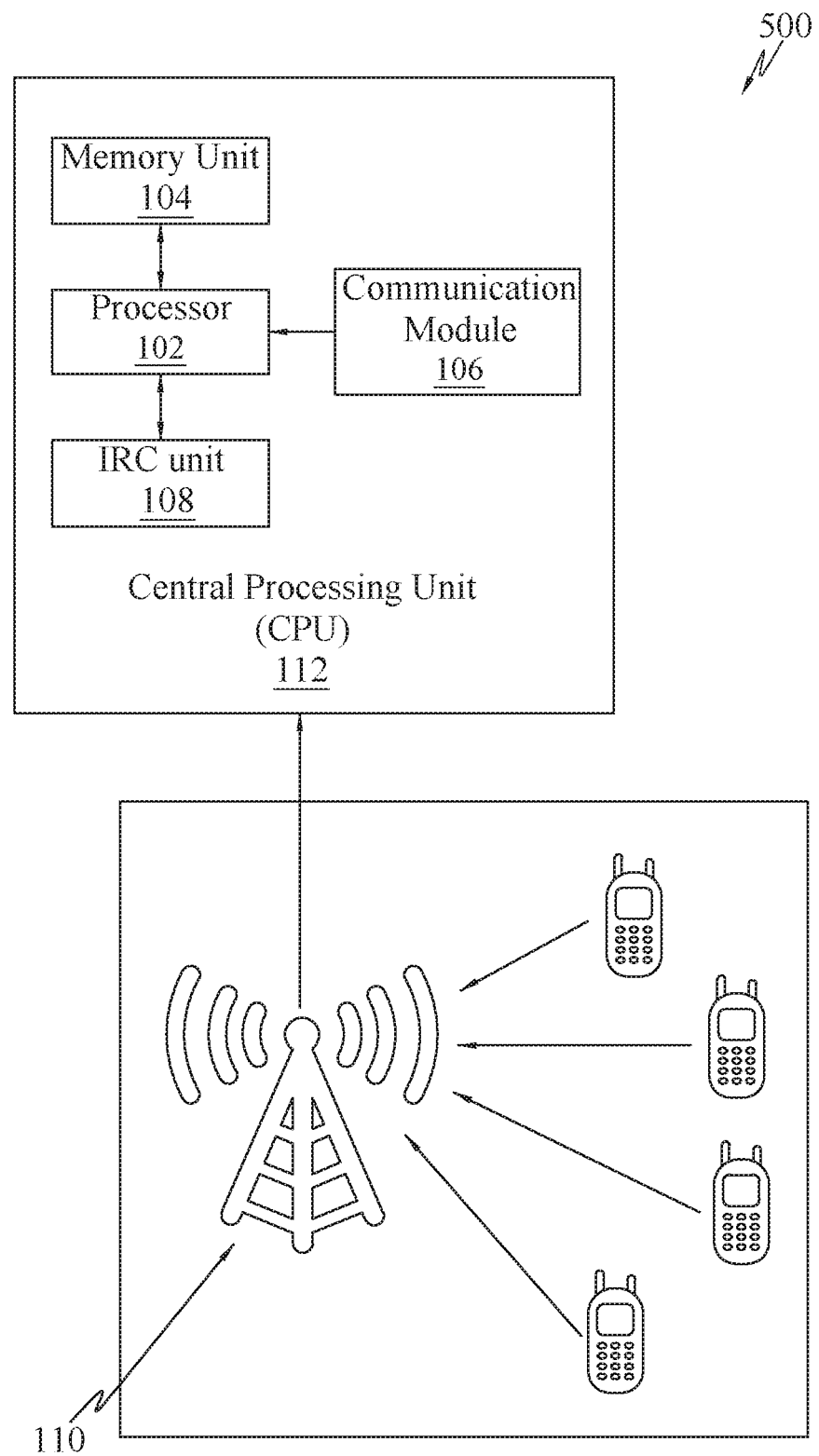
FIG. 5B is an exemplary system 500, comprising 1 Cell, 1 Base station (BS), many users/BS and 2 antennas/User, for selecting the best possible users in a cell.

As an example, let's consider the system 500 of FIG. 5B. The system 500 of FIG. 5B includes 1 cell and 1 base station 110. As an example, let's assume, the base station 110 comprises 4 antennas (not shown) in the figure. The base station 110 may be associated with 10 user equipment's where each user equipment comprises two antennas. Let's consider, a first user equipment is transmitting uplink signals. The first user equipment comprises two antennas and transmits 2 bits, say $d_1$, $d_2$ through a channel $h_1$ to 4 antennas of the base station 110. The processor 102 may be configured to select two user equipment's transmitting bits $d_3$ and $d_4$ through their two antennas. Provided antennas of user equipment of the second and third users are transmitting one bit each to obey the condition of number of antennas have to be greater than or equal to the number of bits transmitted by the user equipment's. The processor 102 has to manage the transmission of the user equipment's transmitting bits $d_3$ and $d_4$ such that the performance of the user equipment transmitting $d_1$ and $d_2$ is not affected significantly by the transmission of $d_3$ and $d_4$. It may be noted that all the bits $d_1$, $d_2$, $d_3$ and $d_4$ transmitted by the three user equipment's corresponds to the same subcarrier.

At step 502, the processor 102 computes the singular value decomposition (SVD) of the channel matrix of the first user equipment after enabling the first user to transmit two bits through two antennas i.e. $h_1$ as shown below.

$$SVD(h_1) = [U_1 S_1 V_1^H]$$

where $U_1$ $S_1$ and $V_1^H$ are 4*4, 4*2 and 2*2 matrices respectively. At step 504, the $4*4 U_1$ matrix is obtained as a result of decomposition, such that the 4*4 matrix $U_1$ multiplied by $S_1$ becomes the effective 4*2 channel matrix for the first user for transmission where effective channel matrix is given as $x=[x_1, x_2]=U_1 S_1$. It may be noted that bottom half of $S_1$ is all-zero matrix, and upper half is a diagonal matrix.

The processor 102 is configured to allow first user equipment to transmit two bits $d_1$ and $d_2$ after being multiplied by $V_1$. Let $d_1'$ and $d_2'$ represents the data bits $d_1$ and $d_2$ which upon transmission are multiplied by $V_1$ which is given below.

$$\begin{bmatrix} d_1' \\ d_2' \end{bmatrix} = V_1 \begin{bmatrix} d_1 \\ d_2 \end{bmatrix}$$

At step 506, the processor 102 enables other (n−2) users i.e. second and third user in the base station to transmit one data bit each through two antennas to the base station on the same sub-carrier as the first user and computes the effective channel matrix for (n−2) users using unitary matrix of the first user. The processor 102 computes the precoder determination algorithm (PDA) value say $V_2$ for the second user equipment. $V_2$ is expressed as, $$[V_2, \theta] = \psi[U_1, h_2, k]$$

where $h_2$ is a vector representing a 4*2 channel matrix for the second user equipment. It may be noted that precoders $V_2$ and $V_3$ corresponds to second and third user equipment are 2×1 matrices.

The processor 102 is configured to compute the scalar value k. If k=3, the precoder determination algorithm (PDA) computes $V_2$ such that $h_2 V_2$ aligns as much as possible with the third column of the 4×4 matrix of "$U_1$" obtained from the singular value decomposition of the channel value $h_1$ of the first user equipment. If k=4, the precoder determination algorithm (PDA) computes $V_2$ such that $h_2 V_2$ aligns as much as possible with the fourth column of the 4×4 matrix of "$U_1$" as much as possible. At step 508, the best value of precoder determination algorithm (PDA) "$V_2$" is computed for the second user equipment using the precoder determination algorithm (PDA), as shown below.

$$[V_2^{(1)}, \Theta^{(1)}] = \psi[U_1, h_2, 3]$$

$$[V_2^{(2)}, \Theta^{(2)}] = \psi[U_1, h_2, 3]$$

where $h_2$ is a vector representing a 4×2 channel matrix of the second user equipment The best value among $V_2^{(1)}$ and $V_2^{(2)}$ is considered to be the precoder determination algorithm (PDA) value for the second user equipment.

At step 508, the best "$V_2$" will be used for the transmission for the second user equipment. As an example, if $\Theta^{(2)} > \Theta^{(1)}$ which implies $V_2$ to be selected is $V_2^{(2)}$ or vice versa. If $\Theta^{(2)} > \Theta^{(1)}$, the second user equipment uses precoder value $V_2 = V_2^{(2)}$ which is computed by the processor 102 using the precoder determination algorithm (PDA). The second user equipment then transmits one bit $d_3$ across two antennas as represented as $V_2 d_3$. The processor 102 computes the precoder value for the third user equipment by using precoder determination algorithm (PDA) which can be expressed as given below.

$$[V_3, \Theta] = \psi[U_1, h_3, 3]$$

If $\Theta^{(1)} > \Theta^{(2)}$, the second user equipment uses precoder value $V_2 = V_2^{(1)}$ which is computed by the processor 102 using the precoder determination algorithm (PDA). The processor 102 computes the precoder value for the third user equipment by using precoder determination algorithm (PDA) which can be expressed as given below.

$$[V_3, \Theta] = \psi[U_1, h_3, 4]$$

At step 510, the processor is configured to allow the second user equipment possessing the best precoder determination algorithm (PDA) value for the transmission. The second user equipment then transmits one bit $d_3$ across two antennas as $V_2 d_3$. At step 512, determine a precoder transmitter for a third user equipment using Precoder Determination Algorithm (PDA) such that number of users are less than or equal to the number of antennas.

It may be noted that, once the second user equipment transmits the corresponding bits then a third user equipment transmits one bit $d_4$ across two antennas as $V_3 d_4$. The received signal across the four antennas of base station is expressed as follows.

$$Y = x_1 d_1 + x_2 d_2 + x_3 d_3 + x_4 d_4$$

where $x_3 = h_2 V_2$ and $x_4 = h_3 V_3$

At step 514, the signal bits $d_1, d_2, d_3, d_4$ are decoded at the processor 102 using interference rejection algorithm (IRC) function discussed previously. The signal bits can be decoded as given below.

$$d_1 = w_1^H y \text{ where } w_1^H = x_1^H R_1^{-1}$$

where $R_1 = x_2 x_2^H + x_3 x_3^H + x_4 x_4^H + \Delta^2 I$ $$d_2 = w_2^H y \text{ where } w_2^H = x_2^H R_2^{-1}$$

where $R_2 = x_1 x_1^H + x_3 x_3^H + x_4 x_4^H + \Delta^2 I$ $$d_3 = w_3^H y \text{ where } w_3^H = x_3^H R_3^{-1}$$

where $R_3 = x_2 x_2^H + x_1 x_1^H + x_4 x_4^H + \Delta^2 I$ $$d_4 = w_4^H y \text{ where } w_4^H = x_4^H R_4^{-1}$$

where $R_4 = x_2 x_2^H + x_3 x_3^H + x_1 x_1^H + \Delta^2 I$ where $\Delta^2$ is AWGN (additive white gaussian noise) variance, $R_1, R_2, R_3$ and $R_4$ are covariance matrices corresponding to the first, second and third user respectively and I is a 4×4 identity matrix.

It may be noted that, the precoder value $V_2$ is computed using the precoder determination algorithm (PDA) configured in the processor 102 as discussed previously.

Referring to FIG. 12, a simulation result for a system comprising a base station, wherein each base station comprises 4 antennas. Each user equipment comprises two antennas in each base station wherein each user sends two symbols (bits) to the base station wherein each user has same transmission power. A SVD-based conventional receiver computes two SINRs for a first user equipment and a second user equipment shown by a curve 20 and 24 respectively. Referring to above discussed section, a new user equipment is added which transmits one symbol through two antennas and IRC is used to compute two SINRs of existing user when the new user equipment is added (refer to a curve 22 and 26) and a SINR of the new user equipment which is given by a curve 28. The SINR of existing user equipment degrades shown by the circled portions (observed 2 times in 14 cases). The experiment was repeated 30 times and a threshold was used to select the new user such that it did not result in degradation of performance of the existing user equipment. The results were successfully obtained for about 14 times out of 30 for accommodating new users in the system.

VII. Selecting Best Users for Accommodating in a Cell on the Same Subcarrier

Figure 5C:
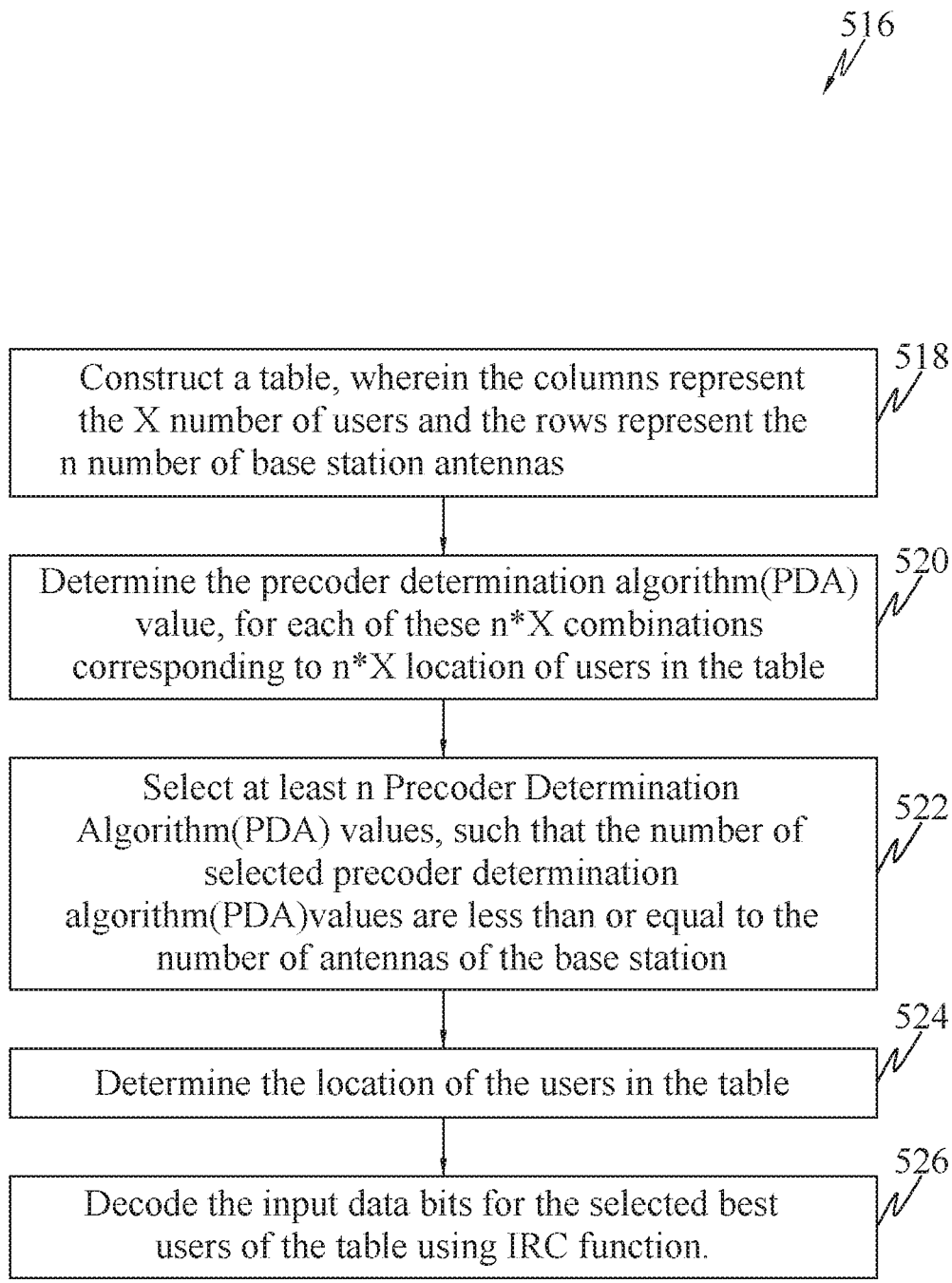
FIG. 5C is a flowchart 516 which illustrates a method for selecting the best possible users to be accommodated in a cell.

Referring to FIG. 5C, a flowchart 516, illustrates a method for selecting the best possible users to be accommodated in a cell. The users are selected such that addition of the selected users does not result in significant loss of signal in the uplink transmission and degradation of the existing user equipment's. The processor 102 is configured to select N users among a plurality of X users such that N users transmit bits equal to or less than the number of antennas "n" of a base station 110. The processor 102 is configured to decode the data bits of each of the selected users received at the "n" antennas using IRC unit 108 (IRC) function.

In an embodiment, the method for selecting the best possible users to be accommodated in a cell involves one cell, one base station 110 within a cell and "n" antennas of the base station 110. "X" user equipment's are associated with the base station 110. These "X" users may belong to the cell to which the base station 110 belongs. The system 100 accommodates, in each of the base stations 110, one or more user equipments such that transmission of uplink signals by all the user equipment's on the same subcarrier doesn't result in significant loss of signal in the uplink transmission of other users transmitting on same subcarrier. Each user equipment associated to a base station is embedded with two antennas. The total number of users is less than or equal to "n", the number of antennas.

Referring to the flowchart 516, at step 518, the processor 102 is configured to construct a table, wherein the columns represent the X number of users (may be referred to a user equipment carried by user) and the rows represent the n number of n antennas of the base station 110. At step 520, the precoder determination algorithm (PDA) value is determined, for each of these n*X locations of table, using [V,Θ]=ψ[U, h, k], where V is a precoder matrix used for transmitting bits, Θ is a scalar value, U is a unitary matrix, h is a channel matrix of that user and k is a value from 1 to n, which gives X*n PDA values which corresponds to n*X locations of the table. At step 522, the processor 102 selects at least n Precoder Determination Algorithm (PDA) values such that the number of selected precoder determination algorithm (PDA) values are less than or equal to the number of antennas of the base station 110. At step 524, based on the value of the precoder determination algorithm (PDA) values of the users in the table, the location of the users in the table is determined. At step 526, the IRC unit decodes the input data bits for the selected best users of the table using the Interference Rejection Combining (IRC) function. Steps are similar in nature from 510 till 514 of FIG. 5A, as discussed earlier, are performed subsequent to step 526.

Figure 5D:
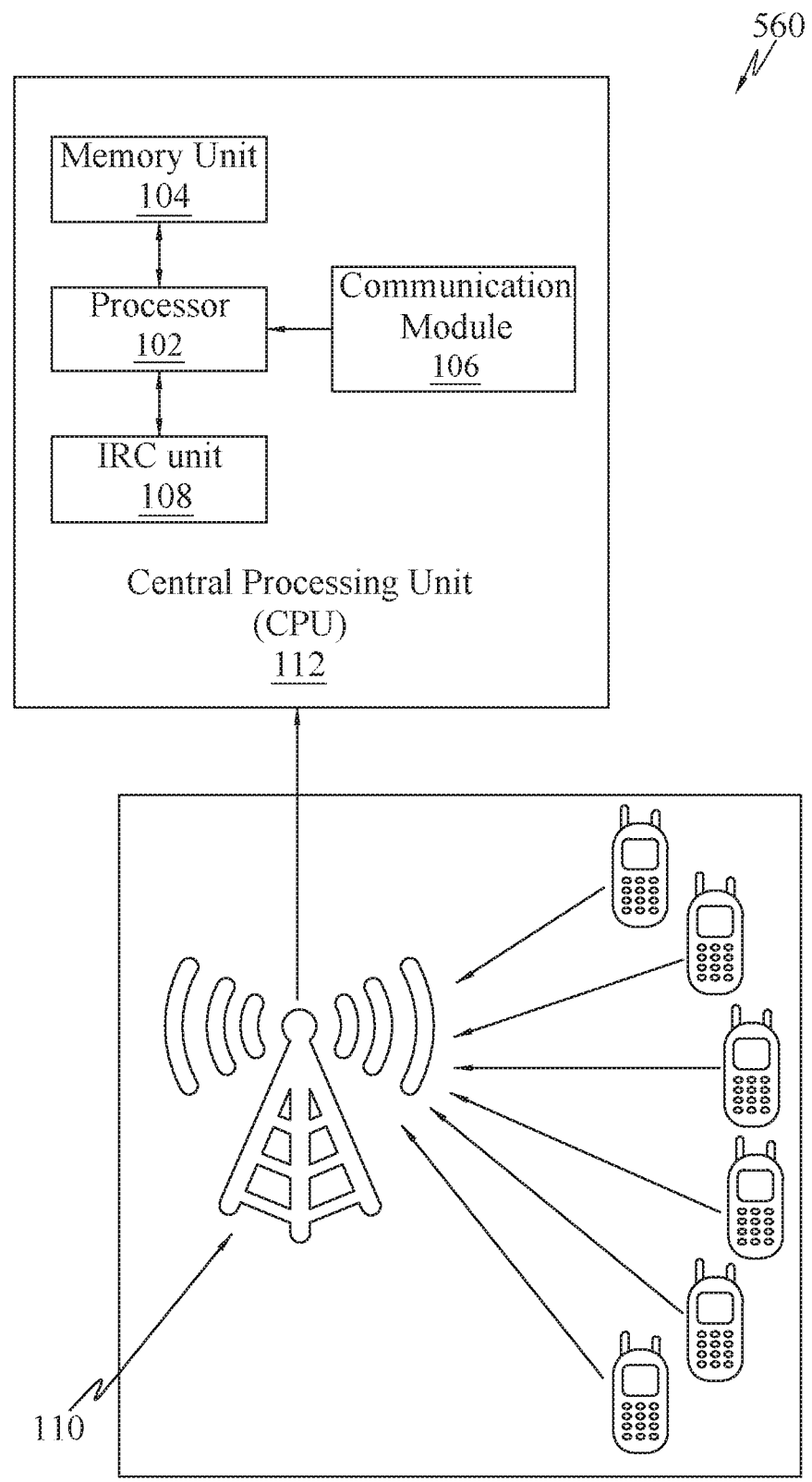
FIG. 5D is another exemplary system 560, comprising 1 Cell, 1 Base station (BS), many users/BS and 2 antennas/User, for selecting the best users to be accommodated in a cell.

As an example, let's consider system 560 of FIG. 5D. There are four antennas of a base station 110 with six user equipment's associated with the base station 110. Let $U=[U_1, U_2, U_3$ and $U_4]$ are orthogonal vectors. As an example, the vectors $U_1$, $U_2$, $U_3$ and $U_4$ are shown below.

$$U_1 = \begin{bmatrix} 1 \\ 0 \\ 0 \\ 0 \end{bmatrix}, U_2 = \begin{bmatrix} 0 \\ 1 \\ 0 \\ 0 \end{bmatrix}, U_3 = \begin{bmatrix} 0 \\ 0 \\ 1 \\ 0 \end{bmatrix}, U_4 = \begin{bmatrix} 0 \\ 0 \\ 0 \\ 1 \end{bmatrix}$$

A Table 1 corresponds to row values which are represented by i and column values which are represented by j. The i values represent the orthogonal vector U where values of i ranges from 1 to 4 which represents the four antennas of the base station 110. The j values represent the six user equipment's associated with the base station 110. The Table 1 is given below.

TABLE 1

|  | j = 1 | j = 2 | j = 3 | j = 4 | j = 5 | j = 6 |
| --- | --- | --- | --- | --- | --- | --- |
| i = 1 Ui | $[V_{11}, \Theta_{11}]$ | $[V_{12}, \Theta_{12}]$ | $[V_{13}, \Theta_{13}]$ | $[V_{14}, \Theta_{14}]$ | $[V_{15}, \Theta_{15}]$ | $[V_{16}, \Theta_{16}]$ |
| i = 2 Ui | $[V_{21}, \Theta_{21}]$ | $[V_{22}, \Theta_{22}]$ | $[V_{23}, \Theta_{23}]$ | $[V_{24}, \Theta_{24}]$ | $[V_{25}, \Theta_{25}]$ | $[V_{26}, \Theta_{26}]$ |
| i = 3 Ui | $[V_{31}, \Theta_{31}]$ | $[V_{32}, \Theta_{32}]$ | $[V_{33}, \Theta_{33}]$ | $[V_{34}, \Theta_{34}]$ | $[V_{35}, \Theta_{35}]$ | $[V_{36}, \Theta_{36}]$ |
| i = 4 Ui | $[V_{41}, \Theta_{41}]$ | $[V_{42}, \Theta_{42}]$ | $[V_{43}, \Theta_{43}]$ | $[V_{44}, \Theta_{44}]$ | $[V_{45}, \Theta_{45}]$ | $[V_{46}, \Theta_{46}]$ |

The processor 102 is configured to compute the entry for (i,j) i.e. $i^{th}$ row and $j^{th}$ column is computed by the precoder determination algorithm (PDA) corresponding to the user equipment and the column of the orthogonal vectors U which is given in the Table 1 which corresponds to the $j^{th}$ user equipment and $i^{th}$ column of U. Entries of the user equipment's are computed for 4*X i.e. 4*6 which are 24 locations of the Table 1. As an example, entry for the first user equipment corresponding to first row and first column of the table can be represented as $[V_{1l}, \Theta_{1l}]$, first user equipment corresponding to second row and first column can be represented as $[V_{2l}, \Theta_{2l}]$ where entries represent the outputs obtained by using precoder determination algorithm (PDA). Likewise, there are 22 more locations of the user equipment's which can be represented corresponding to their respective rows and columns in the table. The precoder determination algorithm (PDA) value for all the 24 entries is computed by the processor 102 which is configured with the precoder determination algorithm (PDA) by the following equation—

$$[V_{ij}, \Theta_{ij}] = \psi[U, h_j, i]$$

where hj is a channel matrix of user equipment j where hj represents a 4×2 matrix.

As an example, location for the user located in the first row and second column can be represented as below.

$$[V_{12}\Theta_{12}]\psi[U, h_2, 1]$$

where j=2 represents second user equipment and i (i=1) is the parameter which represents the first column of the U matrix. Likewise, all other 23 locations can be represented by the precoder determination algorithm (PDA).

"$[V_{ij}, \Theta_{ij}]$" is computed by precoder determination algorithm (PDA) for all 24 locations of the user equipment's in the table Out of 24 entries of the user equipment's the maximum entry $\Theta_{ij}$ in each row of the table is selected and the corresponding bits transmitted by the user equipment's are decided as shown in the Table 2. In all the locations of the table, 4 maximum entries may be selected.

TABLE 2

|  | j = 1 | j = 2 | j = 3 | j = 4 | j = 5 | j = 6 |
| --- | --- | --- | --- | --- | --- | --- |
| i = 1 Ui | X |  |  |  |  |  |
| i = 2 Ui | X |  |  |  |  |  |
| i = 3 Ui |  |  |  |  |  | X |
| i = 4 Ui |  |  | X |  |  |  |

The Table 2 implies user equipment's with the maximum value of "®" are user equipment first, third and the sixth user corresponding to the locations are also marked. Each of the selected users is allowed to transmit "m" number of bits to the base station, where "m" is the number of maximum values of Θ out of "n" maximum values of Θ, corresponding to respective selected user. Further the Table 2 implies the first user equipment is transmitting two bits and the user equipment's third and sixth are transmitting one bit to the base station.

The transmit precoder of each of the selected users is a concatenation into column of precoder values of V corresponding to the "m" number of values of Θ. The precoder determination algorithm (PDA) value corresponding to the first user equipment which is transmitting two bits (m=2) to the base station is given below which is a 2*2 matrix:

$$V_1 = [V_{11} V_{21}]$$

The first user equipment which transmits two bits through two antennas to the base station is given below which is represented as a 2*1 matrix. The bits (m=1) transmitted by the first user equipment is can be decoded as below.

$$d_1 = \begin{bmatrix} d_{1,1} \\ d_{1,2} \end{bmatrix}$$

where $d_{1,1}$ and $d_{1,2}$ are the two bits transmitted by the first user equipment to the base station. The first user equipment transmits two bits through two antennas as $V_1 d_1$.

The third user equipment transmits only one bit through precoder $V_{43}$ as $V_{43} d_3$ through two antennas. Likewise, the sixth user equipment transmits only one bit through precoder $V_{36}$ as $V_{36} d_6$ through two antennas. After selecting the best user equipment's, the IRC unit 108 uses the interference rejection combining (IRC) on the received signal Y at the base station across the four antennas which is given below.

$$Y = x_1 d_{1,1} + x_2 d_{1,2} + x_3 d_3 + x_6 d_6$$

where $x_1 = h_1 v_{11}$, where $x_2 = h_1 v_{21}$ where $x_3 = h_3 v_{43}$ where $x_6 = h_6 v_{36}$ $d_{1,1} = W_{1,1}^H Y$ where $W_{1,1}^H = x_1^H R_{1,1}^{-1}$ and $R_{1,1} = R - x_1 x_1^H$ $d_{1,2} = W_{1,2}^H Y$ where $W_{1,2}^H = x_2^H R_{1,2}^{-1}$ and $R_{1,2} = R - x_2 x_2^H$ $d_3 = W_3^H Y$ where $W_3^H = x_3^H R_3^{-1}$ and $R_3 = R - x_3 x_3^H$ $d_6 = W_6^H Y$ where $W_6^H = x_6^H R_6^{-1}$ and $R_6 = R - x_6 x_6^H$ where $R = x_1 x_1^H + x_2 x_2^H + x_3 x_3^H + x_6 x_6^H + \Delta^2 I$ As discussed above, the processor is configured to accommodate more users in a base station transmitting on the same subcarrier. Likewise, the processor may be configured to accommodate more users wherein users from a plurality of base stations may be selected to transmit to the plurality of base stations in a same sub-carrier, wherein the plurality of base stations may be considered as a virtual single base station, whose number of antennas is a summation of the antennas of the plurality of base stations and users are a summation of the users of the individual base stations, wherein the above discussed method is applied to the virtual base station for selection of users. Further, upon selection of the best users, the IRC unit computes signal to noise ratio and decodes the input bits of each user in each of the plurality of base stations by applying Interference Rejection Combining function on "n¹" signals received by the plurality of antennas of the plurality of base station and effective channel matrices of the selected users across the plurality of base station.

As an example, consider a scenario comprising 4 base stations wherein each base station comprises 4 antennas. There may be X user equipments associated with all the base stations where each user equipment comprises two antennas. Selection of maximum 16 users distributed across all the base stations may be considered wherein each user equipment is transmitting on a same sub-carrier. The selected users may transmit 16 bits on the same subcarrier. It may be noted that, each user equipment comprises two antennas and selected users may transmit one or more bits through two antennas. As discussed above, the U vector corresponding to 4 antennas was taken into consideration. Likewise, let a U vector corresponding to all 16 antennas of virtual base station be represented as $U = [U_1 \; U_2 \; U_3 \ldots U_{16}]$. The Table 1 as discussed previously may be extended to 16 rows and there may be X columns corresponding to X users associated with all base stations. As discussed above, the channel matrix $h_j$ of $j^{th}$ user is associated with all 16 antennas of all four base stations. The corresponding effective channel vectors of selected users may be computed considering channels to all the 16 antennas of all the base stations. The IRC unit uses the received signal Y across all 16 antennas and effective channel vectors of selected users to calculate SNR and decode bits transmitted by each selected user. It may be noted that selected users are distributed among all the four base stations.

In an embodiment, wherein all the four base stations wherein each base station comprising 4 antennas may be considered as a super base station (may refer to virtual base station) with 16 antennas. The X users distributed among 4 base stations may be considered to be associated with the super base station of 16 antennas. The steps 518-526 may be performed for the super base station comprising 16 antennas with associated X users.

In another embodiment, the vector U may be represented as $U = [U_1 \; U_2 \; U_3 \; U_4]$ and $\overline{U_1} \ldots \overline{U_4}$ are orthogonal unit vectors which may be represented as follows. As an example, $$\overline{U_1} = \begin{bmatrix} 1 \\ 0 \\ 0 \\ 0 \end{bmatrix}, \overline{U_2} = \begin{bmatrix} 0 \\ 1 \\ 0 \\ 0 \end{bmatrix}, \overline{U_3} = \begin{bmatrix} 0 \\ 0 \\ 1 \\ 0 \end{bmatrix}, \overline{U_4} = \begin{bmatrix} 0 \\ 0 \\ 0 \\ 1 \end{bmatrix}$$

The column vector $U_1 \; U_2 \; U_3 \; U_4$ corresponding to a first base station of the super base station may be represented as follows.

$$U_1 = \begin{bmatrix} \overline{U_1} \\ 0_{12} \end{bmatrix}, U_2 = \begin{bmatrix} \overline{U_2} \\ 0_{12} \end{bmatrix}, U_3 = \begin{bmatrix} \overline{U_3} \\ 0_{12} \end{bmatrix}, U_4 = \begin{bmatrix} \overline{U_4} \\ 0_{12} \end{bmatrix}$$

where 0x is a column vector with x zero elements. The steps 518-526 may be performed considering the vector U and users for first base station may be selected after obtaining their effective channel matrices and precoder matrices using PDA. It may be noted that the channel matrix hj for this scenario corresponds to all the 16 antennas of all the four base stations. Likewise, the column vector U corresponding to a second base station may be represented as follows where $U = [U_1 U_2 \; U_3 \; U_4]$.

$$U_1 = \begin{bmatrix} 0_4 \\ \overline{U_1} \\ 0_8 \end{bmatrix}, U_2 = \begin{bmatrix} 0_4 \\ \overline{U_2} \\ 0_8 \end{bmatrix}, U_3 = \begin{bmatrix} 0_4 \\ \overline{U_3} \\ 0_8 \end{bmatrix}, U_4 = \begin{bmatrix} 0_4 \\ \overline{U_4} \\ 0_8 \end{bmatrix}$$

Likewise, the users from the second base station may be selected. The steps 518-526 may be performed to obtain their precoders V and to compute effective channel vectors. Likewise, users from other base stations may be selected and effective channel vectors are computed for all the selected users from all the base stations.

As discussed in previous scenario, IRC unit uses received signal Y across all the 16 antennas of 4 base stations to compute the SNR of all the selected users and their transmitted input bits may be decoded using effective channel vectors of all users.

VIII. Computing Signal to Noise Ratio

As discussed above, the processor 102 is configured to calculate signal to noise ratio for at least a predetermined number of users in one or more of the plurality of combinations of N users. The processor 102 is further configured to reuse signal to noise ratios and associated calculations, which are previously calculated for the predetermined number of users, in the subsequent calculation of SNRs in the combinations of N possible users. Reusing previously calculated values of SNRs in subsequent calculations may reduce the need of complex computation algorithms and processing speed and memory.

The processor 102 may select N users among total X users associated with either one base station 110 or associated with all the base stations 110. Among $^XC_N$ or $X^N$ combinations some of the users in one or more combinations may be repeated. The SNRs of the users repeated in a subsequent combination may be reused in a subsequent step to save memory and to restore processing capabilities of the processor 102. As an example, there may be two combinations of users, such as, $SNR_i$, $SNR_j$, $SNR_k$, $SNR_l$ and $SNR_i$, $SNR_j$, $SNR_m$, $SNR_n$. The processor 102 may calculate $SNR_m$, $SNR_n$ using IRC function while computing SNR of the first combination. Subsequently, the processor 102 may be configured to reuse or utilize the SNRs (i.e. $SNR_i$, $SNR_j$) in the computation of SNR for the second combination. The calculated SNRs are stored within the memory unit 104 of system 100.

Among a group of z users including users in one or more cells channel vectors corresponding to z user equipments are concatenated into the channel matrix H which is represented as $H=[h_1, h_2, h_3, h_4 \ldots h_z]$. The channel H is applied to a decomposition function (QR decomposition). The QR decomposes the channel matrix H as H=VG where $G=[g_1 g_2 g_3 \ldots g_z]$ where G is a column vector Using G's value, a value $\psi_z$ is computed as provided below.

$$\psi_z = \Sigma_{k=1}^z g_k g_k^H + \Delta^2 I.$$

$\psi_{i,z}^{-1}$ is computed (as a result of Woodbury's identity) subsequently as provided below (for the $i^{th}$ user).

$$\psi_{i,z}^{-1} = \psi_z^{-1} + \frac{\psi_z^{-1} g_i g_i^H \psi_z^{-1}}{1 - g_i^H \psi_z^{-1} g_i}$$

$SNR_i$ for the $i^{th}$ user is given below.

$$SNR_i = g_i^H \psi_{i,z}^{-1} g_i$$

where i represents users wherein i=1, 2 ... i−1,i, i+1, ... z. Likewise, above computations are repeated for all the remaining users of the group z.

There may be the scenarios wherein number of antennas of the base station 110 may be greater than the number of users in the group z or number of users in the group z may be greater than the number of antennas. The processor 102 is configured to compute for both the scenarios. Now, consider the scenario where among the group of z users, one more user is added into the group. The group size z changes to (z+1) wherein one more user is added to the group of z users. Let's consider the scenario wherein the group size z is less than the number of antennas n i.e. z<n. The column vector $g_{z+1}$ is computed as given below:

$$g_{temp} = h_{z+1} - \sum_{k=1}^{z} <h_{z+1}, V_k> V_k$$

$$g_{z+1} = \frac{g_{temp}}{\sqrt{<g_{temp}, g_{temp}>}}$$

where $g_{temp}$ is the temporary value of the vector g which is used to determine value of column vector g for the further computations corresponding to the (z+1) users and $<h_{z+1}, V_k>$ represents the dot product of the vectors wherein $V_k$ is the kth column of V.

Now, let's consider the scenario wherein the number of users in a group are more than the number of antennas n of the base station 110 i.e. z≥n. The column vector $g_{z+1}$ is computed as given below.

$$g_{z+1} = V^H h_{z+1}$$

Once the required column vector $g_{z+1}$ is computed then the IRC unit 108 is configured to compute SNR of the $(z+1)^{th}$ user, where $$SNR_{z+1} = g_{z+1}^H \psi_z^{-1} g_{z+1}$$

The updated SNR values for the $i^{th}$ user in the group z when the group size increases to (z+1) is computed using Woodbury identity, $$\psi_{i,z+1}^{-1} = \psi_{i,z}^{-1} - \frac{\psi_{i,z}^{-1} g_{z+1} g_{z+1}^H \psi_{i,z}^{-1}}{1 + g_{z+1}^H \psi_z^{-1} g_i}$$

where SNR of $i^{th}$ user is computed as given below.

$$SNR_i = g_i^H \psi_{i,z+1}^{-1} g_i$$

where i corresponds to number of users in the group z i.e. i=1, 2 ... z. Likewise, SNRs are computed for all the users belonging to the group z. Finally, SNR is updated as $$\psi_{z+1}^{-1} = \psi_z^{-1} - \frac{\psi_z^{-1} g_{z+1} g_{z+1}^H \psi_z^{-1}}{1 + g_{z+1}^H \psi_z^{-1} g_{z+1}}$$

Figure 5E:
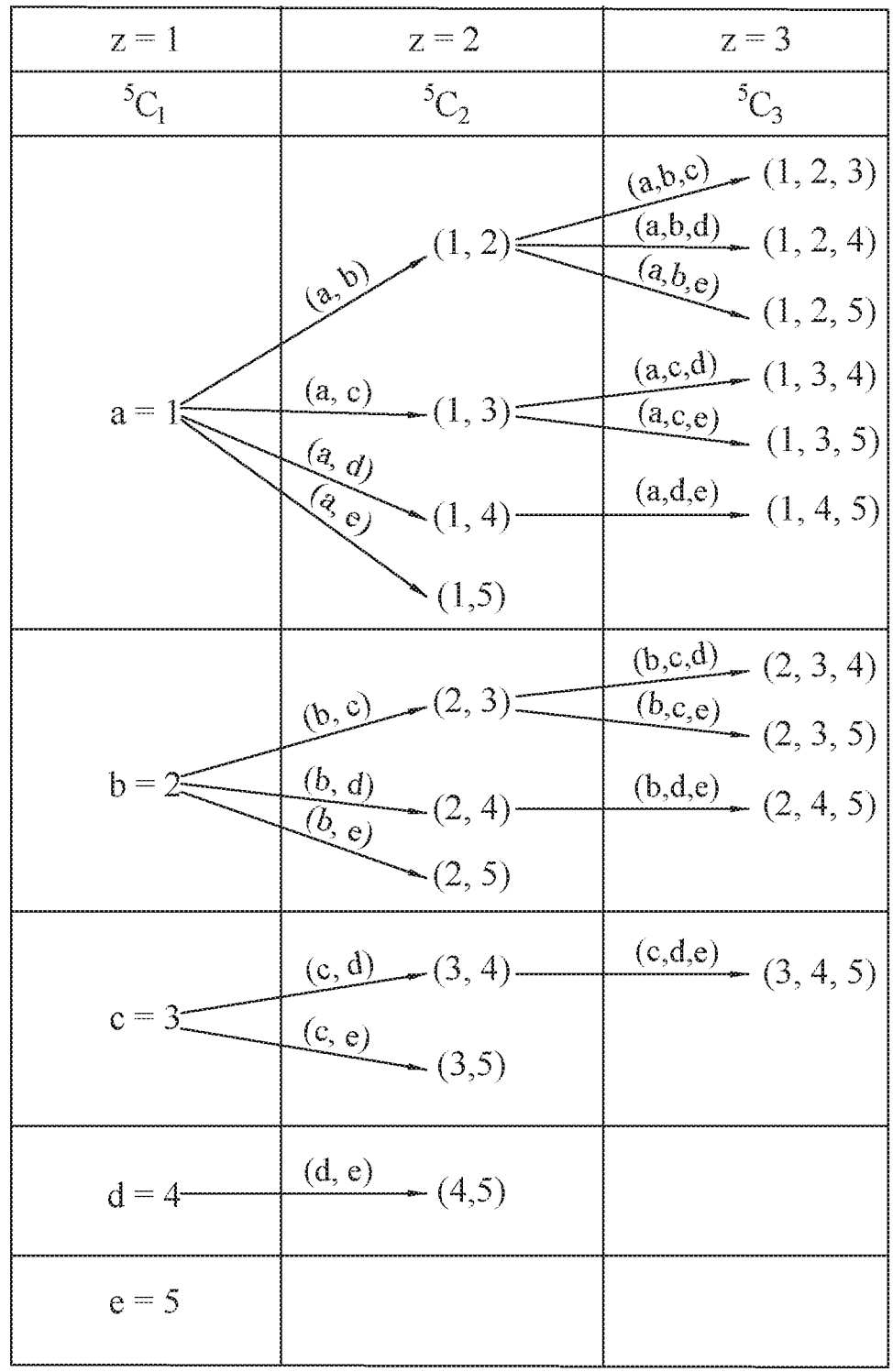
FIG. 5E is a tree structure representing possible combination of users in a subset

Consider the first exemplary system as discussed earlier wherein there is one base station 110 comprising four antennas. As an example, if we consider computation of SNRs for group size of 2 i.e. z=2 which implies there are 2 users belonging to the base station 110. There are $^XC_2$ such groups. Each group is represented as (a,b) such that a<b wherein a and b are user indices. FIG. 5E illustrates a tree structure representing possible combinations of users when the group size increases from z=1 to z=3. It may be noted from the figure that index of a new added user is greater than the indices of the users present in the old subset of users. There may be $^5C_1$ number of combinations when z=1 and X=5. Subsequently, when a new user may be added and group size may be increased to 2. There may be $^5C_2$ combinations at this instance. Likewise, as a new user is added to the subset, group size increases. It may be further noted that number of users' in the group z are less than the number of antennas of the base station 110 i.e. z<n. The SNRs of users in the group z for this scenario can be computed using the methods discussed previously. Subsequently, group size is increased to 3 (a, b, c) and z=3 in this instance. The computation of SNRs is discussed for the scenario when the group size z increases by 1, which can be applied to compute SNRs for this scenario which also includes updating the predetermined computed SNRs for the existing users in the group z. The new user c is added in such a way such that b<c i.e. there are (X-b) candidates for the user c such that computations corresponding to old subset is updated thereby computing SNR only for the new added user. As an example, when z=3 the SNR values for user indices with one of the combinations as (1,2,3) may be computed by updating SNR values of (1,2) and computing SNR value for the user of index 3. It may be noted that there are $^{X}C_3$ such groups and group size z=3. Now, consider the scenario where group size z is increased from 3 to 4, N=4 (a, b, c, d). It may be noted that in this scenario number of users in the group z are equal to the number of antennas of base station 110 i.e. z=n. This computations of SNRs for this scenario is discussed previously. Using these methods, we add a new user d such that c<d. It may be further noted that now there are $^{X}C_4$ such groups. After determining the $^{X}C_4$ groups, the SNRs for all the users in the group are computed.

Now, consider the second exemplary system as we discussed earlier wherein there are four base stations 110a, 110b, 110c and 110d and each base station comprises four antennas and there may be one user in each base station and each base station belongs to a single cell. As an example, if we consider computation of SNRs for a group size z=2 i.e. number of users in the group z are 2 and number of base stations selected are 2. There may be $X^2$ such groups. Each group is represented as (a,b) wherein a and b are user indices. It may be noted that a can be equal to b wherein a is user index corresponding to first cell and b is user index corresponding to second cell. It may be noted that number of users' in the group z are less than the number of antennas of the base station 110 i.e. z<n. The SNRs of users in the group z for this scenario can be computed using the methods discussed previously. Subsequently, group size is increased to 3 (a, b, c) and z=3 in this instance. The computation of SNRs is discussed for the scenario when the group size z increases which can be applied to compute SNRs for this scenario. The new user c is added from the third cell with the base station 110c.It may be noted that there are $X^3$ such groups and group size z=3. Now, consider the scenario where group size z is increased from 3 to 4, N=4 (a, b, c, d) and z=4. It may be noted that in this scenario number of users in the group z are equal to the number of antennas of base station 110 i.e. z=n. This computations of SNRs for this scenario is discussed previously. Using these methods, we add a new user d from the fourth base station 110d corresponding to the fourth cell. It may be further noted that now there are $X^4$ such groups where N=4. After determining the $X^4$ groups, the SNRs for all the users in the $X^4$ groups are computed.

The processor 102 is configured with the above discussed algorithm considering all the scenarios discussed which computes signal to noise ratio in such a way that overall signal to noise ratio for overall system is increased and increase in number of user equipment's communicating with the base stations should not result in significant loss of existing user equipment's in uplink transmission.

VIII. Antenna Selection

Figure 6A:
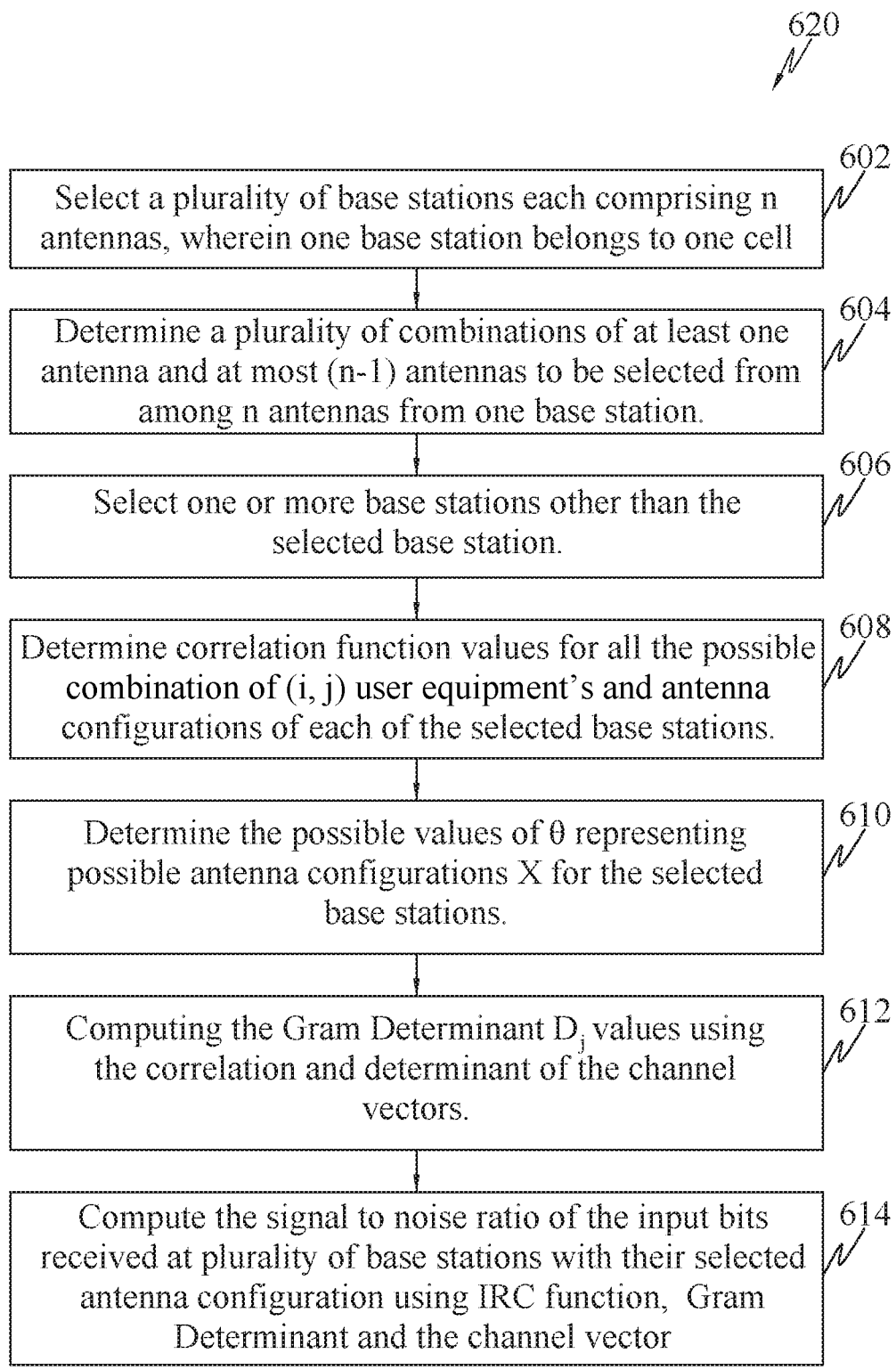
FIG. 6A is a flowchart 620 which illustrates a method of selecting antennas of the N base stations 110.

Referring to FIG. 6A, a flowchart 620 illustrates a method of selecting antennas of the "N" base stations 110. In an embodiment, if output signals from all antennas of all base stations have to be processed, highly complex computation and a substantial amount of memory is required which may not be a good resource utilization. Hence, the processor 102 is configured to select only a predefined number of antennas from which the received signals are processed. Referring to method 620, at step 602, the processor 102 is configured to select a plurality of base stations 110 each comprising n antennas, wherein one base station belongs to one cell. At step 604, the processor 102 determines a plurality of combinations of at least one antenna and at most (n-1) antennas to be selected from among n antennas from one base station 110a. At step 606, the processor 102 selects one or more base stations, other than the base station 110a (shown in FIG. 6B). At step 608, the processor 102 determines correlation function values for all the possible combination of (i,j) user equipments and antenna configurations of each of the selected base station. At step 610, the processor 102 is configured to determine the possible values of θ representing possible antenna configurations X for the selected base stations. At step 612, the processor 102 computes the Gram Determinant values using the correlation and determinant of the channel vectors. At step 614, the processor computes the signal to noise ratio of the input bits received at plurality of base stations with their selected antenna configuration using the interference rejection combining (IRC) function on the signal received at each of the selected antenna configuration using the Gram Determinant and the channel vector.

Figure 6B:
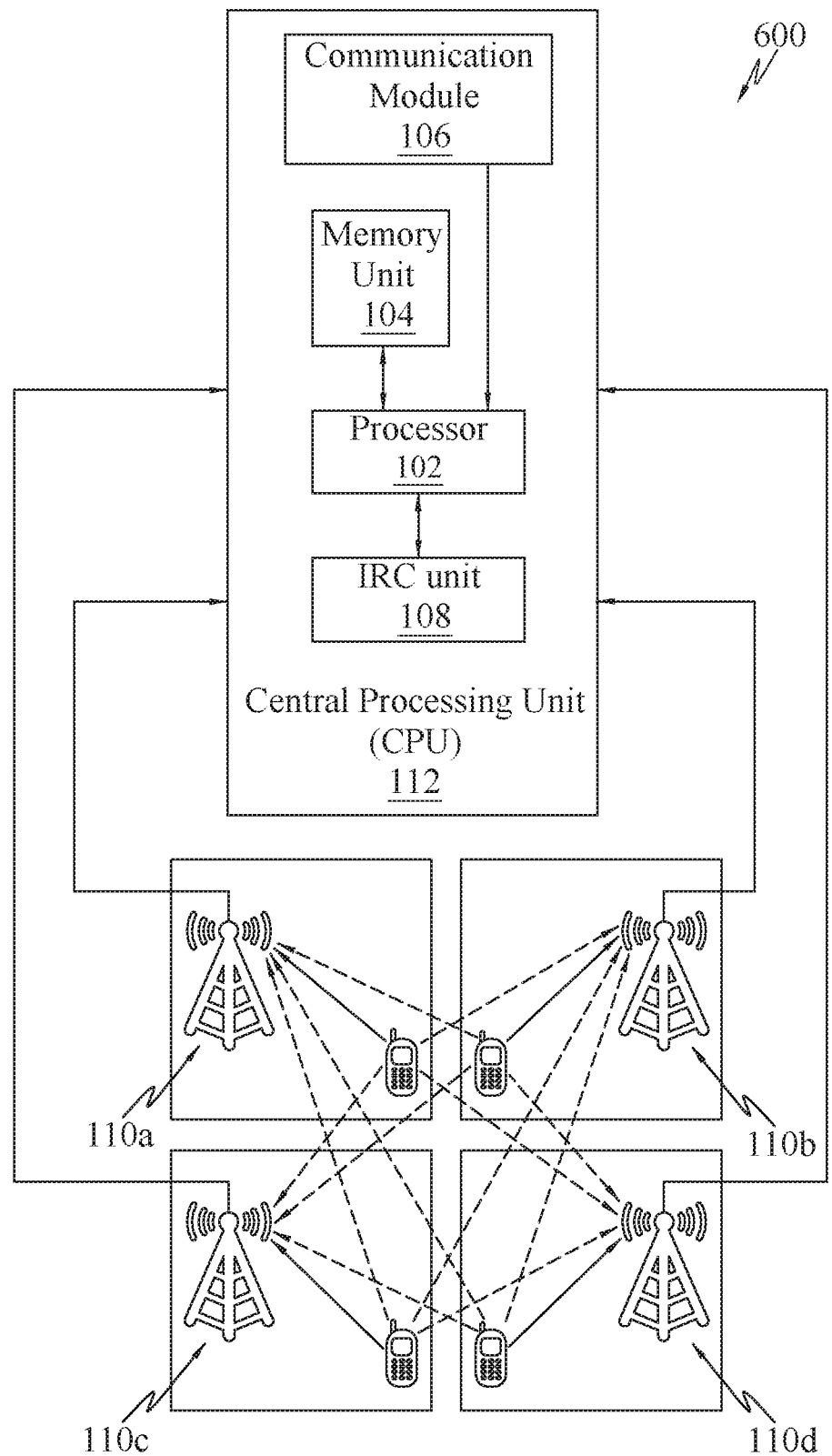
FIG. 6B is an exemplary system 600, comprising N cells, N base stations (BS), 1 User/BS and 1 Antenna/User, for selecting the best set of antennas for the users.

As an example, let's consider the system 600 of FIG. 6B including 4 base stations 110a, 110b, 110c, 110d each base station having 4 antennas and receiving uplink signals from four user equipment's, each user equipment from one cell. Considering the first user equipment belonging to the first base station 110a, the processor 102 is configured to select at least two antennas from a base station 110a.Let $h_1$, $h_2$, $h_3$ and $h_4$ are the channels of the user equipment's belonging to the base stations 110a, 110b, 110c and 110d respectively. It may be noted that, the channels to all the 16 antennas of all the four base stations may be considered. It may be further noted that $g_1$ represents the channel vector comprising channel values of first user corresponding to 4 antennas of base stations 110a.The processor 102 further selects two base stations among 110b, 110c and 110d. Signals received at antennas of base station 110a and signal received at the antennas of the selected two base stations among 110b, 110c and 110d are used by the processor 102 to decode the input bits and compute the $SNR_1$ of the first user equipment associated with the base station 110a.

Now referring to step 602, considering the first user equipment belonging to the base station 110a with the channel vector $g_1$ with the corresponding channel values as a, b, c and d associated with four antennas of the first base station 110a belonging to the first cell which can be represented as channel vector $g_1$ as below. Likewise, channel vector $$g_1 = \begin{bmatrix} a \\ b \\ c \\ d \end{bmatrix}.$$

where a, b, c and d are channel values of the channel vector $g_1$.

Now referring to step 604, the processor 102 determines at least 6 combinations ($^4C_2$=6) of 2 selected antennas to be selected from among 4 antennas from the base station 110a. The binary representation for the possible combinations of 2 antennas selected from 4 antennas for the first user equipment is given by ψ. Let the possible binary values for the 6 possible combinations are $\psi_1, \psi_2, \psi_3, \psi_4, \psi_5, \Omega_6$ where $\psi_1=1100, \psi_2=1010, \psi_3=1001, \psi_4=0110, \psi_5=0101, \psi_6=0011$ and corresponding values of P with respect to binary values $\psi_1, \psi_2, \psi_3, \psi_4, \psi_5, \psi_6$ of 6 possible combinations of antennas be denoted by $P_1, P_2, P_3, P_4, P_5$ and $P_6$ where can be computed as $P_1=|a|^2+|b|^2$ for $\psi_1=1100$, $P_2=|a|^2+|c|^2$ for $\psi_2=1010$, $P_3=|a|^2+|d|^2$ for $\psi_3=1001$, $P_4=|b|^2+|c|^2$ for $\psi_4=0110$, $P_5=|b|^2+|d|^2$ for $\Psi_5=0101$, $P_6=|c|^2+|d|^2$ for $\psi_6=0011$. Let the maximum value among $P_1, P_2, P_3, P_4, P_5$ and $P_6$ be $P_i$. Assuming the maximum value Pi among the six values is $P_1$ with the $\psi_1=1100$. The antenna configuration among 16 antennas of all the base stations maybe denoted as X which can be represented as X=ABCD where A corresponds to the first base station, B corresponds to the second base station, C corresponds to the third base station and D corresponds to the fourth base station. If all the antennas of base station 110b are selected then B=F and if none of the antennas of the base station 110b are selected then B=0. Likewise, C and D can be represented as antenna configurations for the base stations 110c and 110d respectively. The maximum value of $P_1$ with the value $\psi_1=1100$ indicates that the antennas with the channel values as a and b are to be selected among the other possible combinations of antennas which gives the first set of antennas for the first user equipment belonging to the first base station as $A=\psi_1=1100$. Now referring to step 604, the processor may select more than one base stations other than the base station A wherein the antenna configuration for the base station A is already computed at step 604. The processor may select from the base stations B, C, D as the base station A is already selected. It may be noted that the processor is configured in such a way that while selecting the antennas from the B, C and D base stations, all the antennas of the corresponding selected base station are selected. As an example, if B is selected as the base station then antenna configuration for the base station B may be represented as X=For X=0. This concept is explained in detail in later steps.

Referring to step 608, the processor 102 is configured to compute the correlation function values for all the possible combination of values of channel vector for user equipment's of i and j for each user equipment belonging to one base station, where i=1,2,3,4 and j=1,2,3,4 where combination of values of (i,j) represent each user equipment for each of the base stations 110a, 110b, 110c and 110d. There can be 16 combination of values of (i,j) for each user equipment for each base station as (1, 1),(1,2),(1,3),(1,4),(2,1),(2,2),(2,3), (2,4),(3, 1),(3,2),(3,3),(3,4),(4, 1),(4,2),(4,3),(4,4) for which combination of values correlation function is computed by the processor 102. The channel vectors for each user equipment is represented as $h_1^{(X)}, h_2^{(X)}, h_3^{(X)}$ and $h_4^{(X)}$ corresponding to user equipment's first, second, third and fourth respectively with the combinations of antenna configuration (X) represents antenna selection from first, second, third and fourth base stations. The processor 102 may be configured to compute correlation function values for all the combination of values of (i,j) which is given as dot product of channel vectors $h_j^{(X)}$ and $h_i^{(X)}$ where X corresponds to base stations 110a, 110b, 110c and 110d which are represented as ABCD respectively. A set of antennas from the first base station 110a is represented by A=1100 corresponding to $\psi_1=1100$ which depicts the antennas of the first base station are selected. The corresponding value of X which represents antenna configuration for the first base station is X=A000 which is computed at the step 604. It may be noted that the antenna configuration where antennas of the second base station are selected is given as X=0F00. Likewise, the antenna configuration where only antennas of the third base station 110c are selected is given as X=00F0 and for the antenna configuration for the fourth base station, antenna configuration is given as X=000F. The correlation function can be expressed by the relation as given below.

$$\text{corr}(i,j,X)=(h_j^{(X)} \cdot h_i^{(X)}) \text{ is a dotproduct}$$

The processor 102 may be further configured to compute 64 (16*4) correlation functions corresponding to 16 combinations of (i,j) corresponding to all the four antenna configurations (X) as discussed above which may be represented as (X=A000, X=0F00, X=00F0, X=000F) corresponding to base stations A, B, C and D respectively. Referring to step 610, the processor 102 may compute the correlation function values for other possible combinations of antenna configurations where possible combinations are represented by θ. The processor 102 may select the combination of values of θ such that θ corresponds to the possible $^{(N-1)}C_y$ combinations where (N–1) represents the number of base stations other than the selected first base station as the first base station is always selected assuming the user equipment belongs to the first station) where y corresponds to the number of base stations to be selected from (N–1) base stations. As an example, N corresponds to the number of base stations i.e. N=4 and (N–1) indicates the antenna configuration to be selected remaining (4-1) base stations where antenna configuration for the first base station is selected at step 604 and y(y=2) corresponds to the number of base stations to be selected from 3 base stations. The processor is configured to select antennas from the remaining (4-1) base stations. The number of combinations of θ can be $^{(4-1)}C_2$ combinations which gives 3 combinations where it indicates there may be two base stations to be selected from 3(4-1) remaining base stations in the system comprising four base stations where the first base is already selected belonging to the first base station. The possible combinations of values of θ representing the possible antenna configurations for the selected base stations are given below.

$$\theta=\{X=AFF0, X=A0FF, X=AF0F\}$$

It may be noted that if a base station other than the first base station is selected, all the antennas of that base station are also selected. As an example, the first value of θ where X=AFF0, clearly indicates that the first base station is selected and antenna configuration corresponding to the first base station is computed at step 604. For the base stations B (110b) and C (110c) all the antennas are selected. Likewise, it may be applied to all the values of θ with their respective antenna configurations X.

Referring to step 612, the processor 102 may be configured to split the correlation function for the first value of θ given as the sum of correlation function values where the output of splitting the correlation function for the first value of θ for X=AFF0 can be expressed as below.

$$\text{corr}(i,j,X=AFF0)=\text{corr}(i,j,A000)+\text{corr}(i,j,0F00)+\text{corr}(i,j,00F0)$$

The processor 102 may be configured to split the correlation function for all the θ values into (y+1) correlation functions. There may be (2+1) 3 number of correlation functions. The three correlation functions obtained may be computed by reusing the recorded values of the correlation functions for all the possible 64(16*4) values which are computed at step 606. The Gram determinant matrices Dj for all values of $j=1,2,3,4$ may be computed by the processor 102 where Dj is determinant of a j×j matrix for all the values of $j=1,2,3,4$ wherein the $(i,k)^{th}$ elements of matrices are obtained by the dot product of $(h_k^{(X)}, h_i^{(X)})$ where $D_1$ is a 1×1 matrix, $D_2$ is a 2×2 matrix, $D_3$ is 3×3 matrix and $D_4$ is a 4×4 matrix. $D_0=1$. Further, using the correlation and the determinant of the channel vectors, Gram determinant ($e_j$) of the channel vectors may be computed and obtained using the expression as shown below.

$$e_j = \frac{1}{\sqrt{D_{j-1} D_j}} \begin{vmatrix} Corr(1,1,X) & Corr(1,2,X) & \ldots & Corr(1,j,X) \\ \vdots & \vdots & \ldots & \vdots \\ Corr(j-1,1,X) & Corr(j-1,2,X) & \ldots & Corr(j-1,j,X) \\ h_1^{(X)} & h_2^{(X)} & \ldots & h_j^{(X)} \end{vmatrix}$$

Referring to step 614, Gram determinant ($e_j$) of the channel vectors may be used to compute the SNR of the signals received at the base stations 110, transmitted through the channels. SNR is expressed in terms of G, where $G=[g_1, g_2, g_3, g_4]$ and $G=e^H h$, where $e=[e_1, e_2, e_3, e_4]$ and $h=[h_1^{(X)}, h_2^{(X)}, h_3^{(X)}, h_4^{(X)}]$. The SNR ($z_1$) of a first user belonging to base station 110a may be computed using an IRC (interference rejection combining) unit 108 is expressed as shown below.

$$z_1 = SNR(1,X) = g_1^H [g_2 g_2^H + g_3 g_3^H + g_4 g_4^H + \Delta^2 I]$$

where $\Delta^2$ is AWGN (additive white gaussian noise) and I is an Identity matrix of appropriate dimension.

Likewise, for the antenna configurations with X=A0FF, AF0F signal to noise ratios (SNR) $Z_2$ and $z_3$ may be computed. The maximum value among $z_1$, $z_2$ and $z_3$ may be considered and the antenna configuration X corresponding to the maximum value among $z_1$, $z_2$ and $z_3$ may be selected as the best configuration of antennas among the other antenna configurations.

Above computations may be provided for the first user equipment belonging to the first base station. Likewise, computations may be performed to select the best possible antenna configuration for all the user equipment's belonging to their respective base station.

X. Channel Estimation

Figure 7:
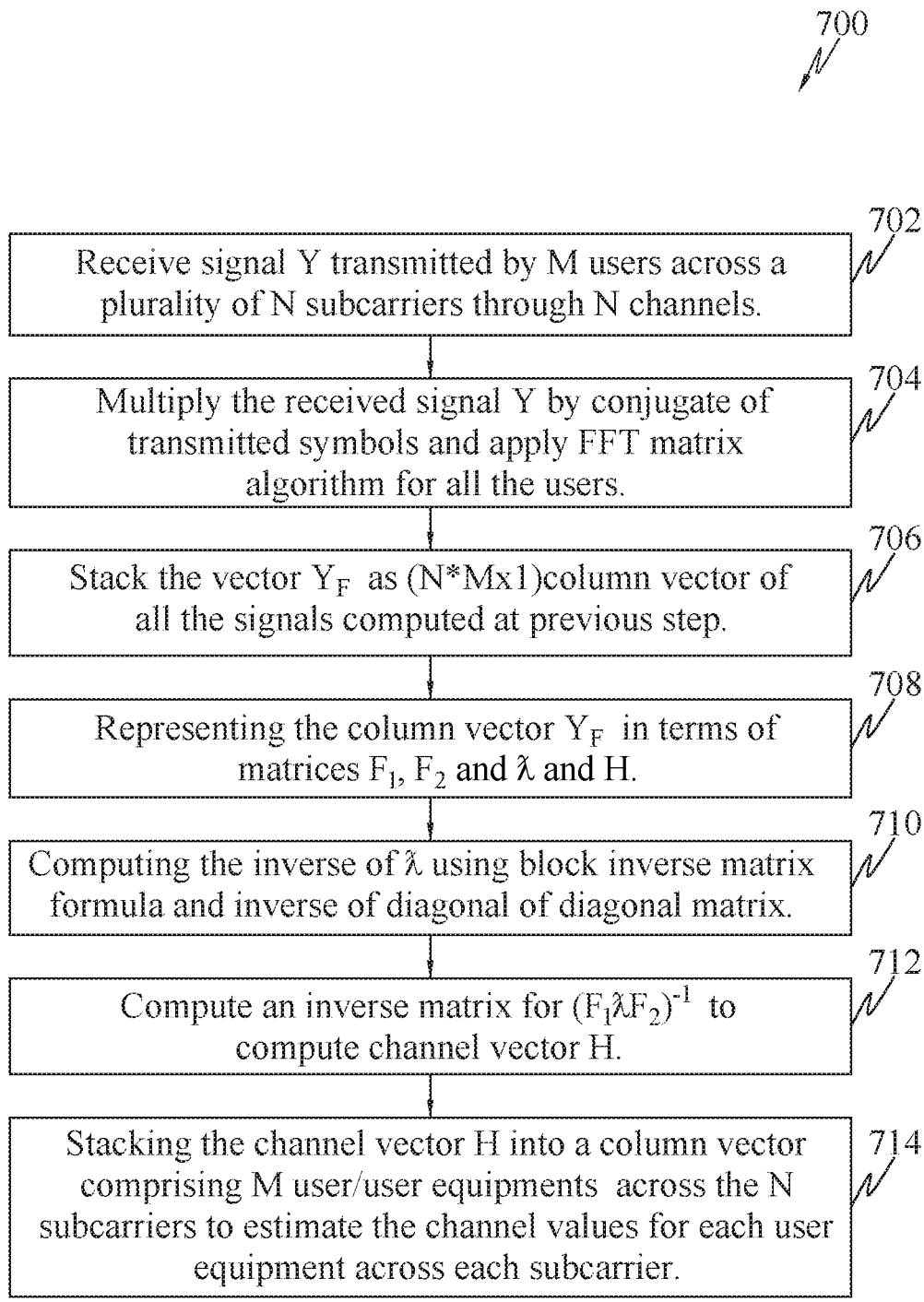
FIG. 7 is a flowchart 700 which illustrates an exemplary method to estimate the channel values of M users across N subcarriers.

Referring to FIG. 7, a flowchart 700 illustrates an exemplary method to estimate the channel values of M users (may be referred to user equipment) across N subcarriers. The sum of values at each subcarrier has to be separated to compute the channel values of the transmitted signals over the subcarriers.

Considering N subcarriers, the processor 102 may be configured to compute $Y_1$ and $Y_2$ by using FFT matrix algorithm. A vector $Y_F$ may be obtained by vector multiplication of conjugate of their data bits with the received signals over N subcarriers. $Y_F$ is a column vector which is represented in such a way $Y_1$ and $Y_2$ form a 2×1 block column matrix. Further, the processor 102 may be configured to compute inverse of λ using block matrix inverse formula. The exemplary system may be configured to compute estimate of a vector H to decompose the vector into diagonal matrices. The vector H may be represented as a column matrix comprising $H_1$, $H_2$ to compute $h_1$ and $h_2$ over N subcarriers.

The channel values for the first user equipment across subcarriers 1, 2 . . . N may be a, b . . . d respectively. Likewise, channel values for a second user equipment across subcarriers 1, 2 . . . N may be a', b' . . . d'. In LTE, a Resource Block has N=12 subcarriers. If we consider two Resource blocks, then we have N=24 subcarriers. As an example, if one user equipment is transmitting through a set of subcarriers and if another user transmits across the same set of subcarriers which means at each subcarrier we have sum of the transmission by the two user equipment's.

At step 702, a first user equipment may transmit symbols across subcarriers 1, 2 . . . N. Likewise, the second user equipment may transmit symbols across subcarriers 1, 2 . . . N. At step 704, the received signal at subcarriers 1, 2 . . . N may be denoted as $Y=h_1 \otimes d_1 + h_2 \otimes d_2 + n$ where $\otimes$ represents element by element multiplication of two vectors. The symbols across N subcarriers may be stacked into a vector which is denoted as $d_1$. Similarly, for the second user equipment these symbols may be stacked into a vector which is denoted as $d_2$.

Let the channel values for the first user equipment across subcarriers 1, 2 . . . N are a, b . . . d respectively and are stacked into a channel vector $h_1$. Similarly, the channel values for the second user equipment across subcarriers 1, 2 . . . N are a', b' . . . d' respectively and stacked into a channel vector $h_2$. The processor 102 may be configured to estimate the channel values for the first and the second user equipment represented by $h_1$ and $h_2$ respectively on the received signal Y where the channel values of the first equipment i.e. (a, b . . . d) and the second user equipment i.e. (a', b', . . . d') varies slowly across the subcarriers 1, 2, . . . N. The algorithm for estimating the channel values in such scenarios is discussed in detail.

At step 704, the processor 102 may be configured to compute the FFT of the N×1 subcarrier matrix for all the users. Let the FFT matrix function be denoted as F. At step 704, the processor 102 computes signals $Y_1$ and $Y_2$ using the FFT algorithm, by using the received signal "Y" across the subcarriers of the base station 110. $Y_1$ and $Y_2$ are provided below.

$$Y_1 = F^*(Y \otimes d_1^*)$$

$$Y_2 = F^*(Y \otimes d_2^*)$$

where $d_1^*$ and $d_2^*$ corresponds to conjugate of the data symbols transmitted by the first user equipment and the second user equipment respectively.

At step 706, the signals $Y_1$ and $Y_2$ computed in the previous step may be aligned as 2×1 block column matrices comprising $Y_1$ and $Y_2$. The output of this column matrix be denoted as $Y_F$ which is expressed below.

$$Y_F = \begin{bmatrix} Y_1 \\ Y_2 \end{bmatrix}$$

At step 708, obtained column vector $Y_F$ may be represented in terms of block diagonal matrices $F_1$, $F_2$ and λ where the matrices can be represented as given below.

$$Y_F = F_1 * \lambda * F_2 * H$$

$$Y_F = \begin{bmatrix} \frac{F^H}{N} & 0 \\ 0 & \frac{F^H}{N} \end{bmatrix} * \begin{bmatrix} I & diag(\overline{d_2} \otimes d_1^*) \\ diag(\overline{d_1} \otimes d_2^*) & I \end{bmatrix} * \begin{bmatrix} F & 0 \\ 0 & F \end{bmatrix} * H$$

where $F_1$, $F_2$ and λ are block diagonal matrices wherein element $$\frac{F^H}{N}$$

is along diagonal for the $F_1$ matrix and element F is along diagonal for the $F_2$ matrix. $\hbar$ is a block diagonal matrix wherein the sub blocks not along main diagonals are obtained by element by element multiplication of the data symbol transmitted by second user equipment $d_2$ to the conjugate of the symbol ditransmitted by the first user. Identity matrix is along the diagonals of the block diagonal matrix of $\hbar$. The bar on $d_1 \otimes d_2^*$ is representation of the block matrix wherein first element obtained by the computation is not altered but remaining elements thus obtained by the computation are flipped, such that, last element of the matrix occupies the second place and thereby arranged in decreasing order of the column number it has occupied. As an example, if vector $$x = \begin{bmatrix} x_1 \\ x_2 \\ x_3 \\ x_4 \end{bmatrix}$$

then $$\overline{x} = \begin{bmatrix} x_1 \\ x_4 \\ x_3 \\ x_2 \end{bmatrix}$$

where the second element of the matrix is flipped till the last element of the matrix whereas the first element of the matrix is not altered. Similarly, $\overline{d_1 \otimes d_2^*}$ may be represented in the block diagonal matrix $\hbar$ where $d_2^*$ corresponds to the conjugate of the symbol transmitted by the second user equipment.

At step 710, the processor 102 may use block matrix inversion algorithm and inverse of diagonal matrix to compute inverse of $\lambda$ efficiently. It may be noted that the inverse of a diagonal matrix is a diagonal matrix where the diagonal elements are reciprocal of the elements of the diagonal of the original matrix. Similarly, matrix multiplication of the two diagonal matrices is the multiplication of both the diagonals. Similarly, addition of two diagonal matrices is the sum of the two diagonals is the sum of the diagonals.

At step 712, the channel vector H is estimated as follows:

$$H = (F_1 \lambda F_2)^{-1} Y$$

$$H = F_2^{-1} \lambda^{-1} F_1^{-1} Y$$

$$F_2^{-1} = \begin{bmatrix} \frac{F^H}{N} & 0 \\ 0 & \frac{F^H}{N} \end{bmatrix}$$

$$F_1^{-1} = \begin{bmatrix} F & 0 \\ 0 & F \end{bmatrix}$$

At step 714, the channel value H may be represented as the 2×1 block column matrix with $H_1$ and $H_2$ as the elements of the block column matrix to compute the channel value $h_1$ and $h_2$ of the first user equipment and the second user equipment respectively which may be expressed as shown below.

$$H = \begin{bmatrix} H_1 \\ H_2 \end{bmatrix}$$

$$h_1 = \frac{F^H}{N} H_1$$

$$h_2 = \frac{F^H}{N} H_2$$

$h_1$ and $h_2$ are the required channel values for the first user equipment and the second user equipment respectively estimated over the N subcarriers of the LTE system.

XI. Conclusion

The processes described above is described as sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A method for accommodating multiple users transmitting on a same sub-carrier to a base station comprising a plurality of n antennas, the method comprising:
   computing precoder determination algorithm (PDA) values corresponding to "X" number of users, wherein for each of the "X" users "n" number of such PDA values are computed, wherein the PDA values are computed by a relation, [V, Θ]=ψ[U, h, k] where "V" is a precoder matrix used for transmitting data symbols, "Θ" is a scalar value, "U" is a unitary matrix, "h" is a channel matrix of a corresponding user and "k" is a value from 1 to "n", thereby resulting in X * n PDA values;
   identifying a maximum value of "Θ" for each value of "k", thereby identifying in "n" maximum values of "Θ" from the X * n PDA values; and
   selecting the users to which the "n" maximum values of "Θ" correspond, to transmit to the base station through two antennas on the same sub-carrier, wherein each of the selected users is allowed to transmit "m" number of data symbols to the base station, where "m" is the number of maximum values of "Θ" out of "n" maximum values of "Θ", corresponding to respective selected user.

2. The method of claim 1, wherein obtaining the (PDA) values comprises:
Computing the "$k^{th}$" column of the matrix "U" which is denoted as "u1";
computing the value of "M" which is a product of "u1" and the Hermitian function of "u1";

$$\frac{v_1^H M v_1}{v_1^H v_1}$$

determining the value of "v1" to maximize using Rayleigh-Ritz Ratio theorem where "v1" is the eigen vector of "M" corresponding to the highest eigen value of "M";
computing a precoder value "$V_p$" where "$V_p$" is given by the relation $V_p = (h^H h)^{-1} h^H v_1$ where "h" is the channel matrix and "$h^H$" is the Hermitian function of the channel matrix "h" and "$v_1$" is the eigen vector of "M" corresponding to the largest eigen value;

$$V = \frac{V_p \sqrt{n}}{\sqrt{V_p^H V_p}};$$

computing the precoder value "V" as and $$\Theta = \frac{V_{max}^H M V_{max}}{V_{max}^H V_{max}}$$

computing the value of "Θ" with the relation where V max is the eigen vector corresponding to the maximum eigen value of "M".

3. The method of claim 1, wherein a transmit precoder of each of the selected users is obtained by concatenating into columns the precoder values of "V" corresponding to the "m" number of values of "Θ".

4. The method of claim 3, wherein an effective channel matrix of each of the selected users is a product of the channel matrix "h" for said user and the transmit precoder of corresponding user.

5. The method of claim 4, further comprising computing a signal to noise ratio and decoding input data symbols of each of the selected users by applying an Interference Rejection Combining (IRC) function on signals received by the plurality of antennas of the base station and the effective channel matrices of the selected users.

6. The method of claim 5, wherein computing the signal to noise ratio comprises:
computing signal to noise ratios for a subset comprising of the selected users,
wherein signal to noise ratio is computed for each of the users in the subset;
recording the computed signal to noise ratio and associated calculation that was used to compute the signal to noise ratios corresponding to the subset comprising of the selected users; and
reusing the associated calculations corresponding to the subset of the selected users in calculating the signal to noise ratio as users among the selected users are added to the subset.

7. The method of claim 6, wherein the number of selected users is less than or equal to the number of antennas of the base station.

8. The method of claim 1, wherein users from a plurality of base stations are selected to transmit to the plurality of base stations on a same sub-carrier, wherein the plurality of base stations is considered as a virtual single base station, whose number of antennas is a summation of the antennas of the plurality of base stations and, users correspond to summation of the users of the individual base stations, wherein the steps of claim 1 are applied to the virtual base station for selection of users.

9. The method of claim 8, further comprising computing signal to noise ratio and decoding input data symbols of each of the selected user in each of the plurality of base stations by applying an IRC function on the signals received by the plurality of antennas of the plurality of base station and effective channel matrices of the selected users across the plurality of base stations, wherein the effective channel matrix of each of the selected users corresponds to a product of the channel matrix "h" for said user and the transmit precoder of corresponding user.

10. The method of claim 1 further comprising:
enabling one of the multiple users to transmit two data symbols through two antennas of a user equipment;
decomposing an n×2 channel matrix of the one of the multiple users using Singular Value Decomposition (SVD) into three matrices, wherein the matrices are an n×n unitary matrix which is denoted by the "U", an n×2 partial diagonal matrix which is denoted by "S" and a precoder 2×2 unitary matrix which is denoted by the matrix "V".

11. The method of claim 10, further comprising obtaining the (PDA) values comprising:
computing "$k^{th}$" column of the "U" which is denoted as "u1";
computing the value of "M" which is a product of "u1" and Hermitian function of "u1";

$$\frac{v_1^H M v_1}{v_1^H v_1}$$

determining the value of "v1" to maximize using Rayleigh-Ritz Ratio theorem where "v1" is eigen vector of "M" corresponding to the highest eigen value of "M";
computing a precoder value "$V_p$" where "$V_p$" is given by the relation $V_p = (h^H h)^{-1} h^H v_1$ where "h" is the channel matrix and "$h^H$" is the Hermitian function of the channel matrix "h" and "$v_1$" is eigen vector of "M" corresponding to the largest eigen value;

$$V = \frac{V_p \sqrt{n}}{\sqrt{V_p^H V_p}};$$

computing the precoder value "V" as and $$\Theta = \frac{V_{max}^H M V_{max}}{V_{max}^H V_{max}}$$

computing the value of "Θ" with the relation where V max is the eigen vector corresponding to the maximum eigen value of "M".

12. The method of claim 10, wherein a transmit precoder of each of the selected users is obtained by concatenating into columns the precoder values of "V" corresponding to the "m" number of values of "Θ".

13. The method of claim 12, wherein an effective channel matrix of each of the selected users is a product of the channel matrix "h" for said user and the transmit precoder of corresponding user.

14. The method of claim 13, further comprising computing a signal to noise ratio and decoding input data symbols of each of the selected users by applying Interference Rejection Combining (IRC) function on signals received by the plurality of antennas of the base station and effective channel matrices of the selected users.

15. The method of claim 10, wherein users from a plurality of base stations are selected to transmit to the plurality of base stations in a same sub-carrier, wherein the plurality of base stations is considered as a virtual single base station, whose number of antennas is a summation of the antennas of the plurality of base stations and, users correspond to summation of the users of the individual base stations, wherein the steps of claim 10 are applied to the virtual base station for selection of users.

16. The method of claim 15, further comprising computing signal to noise ratio and decoding input data symbols of each of the selected user in each of the plurality of base stations by applying an IRC function on the signals received by the plurality of antennas of the plurality of base station and effective channel matrices of the selected users across the plurality of base stations, wherein the channel matrices correspond to channels from the selected users to the plurality of antennas of the plurality of base stations and the effective channel matrix corresponds to product of the channel matrix "h" of said user and transmit precoder of corresponding user.

17. The method of claim 16, wherein computing the signal to noise ratio further comprising:
   computing signal to noise ratio for a subset of the selected users;
   recording the computed signal to noise ratio and associated calculation corresponding to the subset of the selected users; and
   reusing the associated calculations corresponding to the subset of the selected users in calculating the signal to noise ratio as users among the selected users are added to the subset.

18. The method of claim 17, wherein the number of selected users is less than or equal to number of antennas of the plurality of base stations.

19. The method of claim 10, further comprising computing a signal to noise ratio and decoding input data symbols of each of the selected users by applying Interference Rejection Combining (IRC) function on signals received by the plurality of antennas of the base station and effective channel matrices of the selected users, wherein, computing the signal to noise ratio comprises:
   computing signal to noise ratio for a subset of the selected users;
   recording the computed signal to noise ratio and associated calculation corresponding to the subset of the selected users; and
   reusing the associated calculations corresponding to the subset of the selected users in calculating the signal to noise ratio as users among the selected users are added to the subset.

20. The method of claim 19, wherein the number of selected users is less than or equal to number of antennas of the base station.

* * * * *